US012170398B2

(12) United States Patent
Yun et al.

(10) Patent No.: US 12,170,398 B2
(45) Date of Patent: Dec. 17, 2024

(54) ANTENNA ASSEMBLY, VEHICLE COMPRISING ANTENNA ASSEMBLY, AND METHOD FOR INSTALLING ANTENNA ASSEMBLY ON VEHICLE

(71) Applicant: LG ELECTRONICS INC., Seoul (KR)

(72) Inventors: Changwon Yun, Seoul (KR); Sunin Jeong, Seoul (KR); Yongkon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 18/009,963

(22) PCT Filed: Jun. 11, 2020

(86) PCT No.: PCT/KR2020/007608
§ 371 (c)(1),
(2) Date: Dec. 12, 2022

(87) PCT Pub. No.: WO2021/251528
PCT Pub. Date: Dec. 16, 2021

(65) Prior Publication Data

US 2023/0352818 A1 Nov. 2, 2023

(51) Int. Cl.
*H01Q 1/32* (2006.01)
*H01R 35/02* (2006.01)

(52) U.S. Cl.
CPC .......... *H01Q 1/3275* (2013.01); *H01R 35/02* (2013.01); *H01R 2201/02* (2013.01)

(58) Field of Classification Search
CPC .......... H01Q 1/32; H01Q 1/12; H01Q 1/1207; H01Q 1/1214; H01Q 1/22; H01Q 1/38;
(Continued)

(56) References Cited

U.S. PATENT DOCUMENTS 4,035,806 A * 7/1977 Powell ................ H01Q 1/3258
248/539
4,115,779 A * 9/1978 Dantzler ................ H01Q 1/084
343/882
(Continued)

FOREIGN PATENT DOCUMENTS

JP 2009182386 8/2009
KR 1020140016286 2/2014
(Continued)

OTHER PUBLICATIONS

PCT International Application No. PCT/KR2020/007608, International Search Report dated Feb. 26, 2021, 6 pages.

*Primary Examiner* — Tho G Phan
(74) *Attorney, Agent, or Firm* — LEE, HONG, DEGERMAN, KANG & WAIMEY

(57) ABSTRACT

Disclosed are an antenna assembly, a vehicle comprising the antenna assembly, and a method for installing the antenna assembly. The present disclosure relates to an antenna assembly installed on a vehicle. The antenna assembly may comprise: an antenna unit which is installed on one surface of a plate of a vehicle; a hinge unit which has one end connected to the antenna unit, penetrates the plate, and comprises a hinge structure; and a communication device which is connected to another end of the hinge unit.

15 Claims, 36 Drawing Sheets

(58) Field of Classification Search
CPC ........ H01Q 7/00; H01R 35/02; H01R 107/00; H01R 24/60
See application file for complete search history.

(56) References Cited

U.S. PATENT DOCUMENTS

| | | | | | |
|---|---|---|---|---|---|
| 4,161,735 | A * | 7/1979 | Zylla | H01Q 1/1228 | 343/715 |
| 5,337,062 | A * | 8/1994 | Sherwood | H01Q 1/3275 | 343/765 |
| 5,711,110 | A * | 1/1998 | Williams | E01F 13/085 | 49/31 |
| 7,528,794 | B2 * | 5/2009 | Zurowski | H01Q 1/1214 | 343/878 |
| 11,211,683 | B2 * | 12/2021 | Morgan | H01Q 1/3283 | |

FOREIGN PATENT DOCUMENTS

| | | |
|---|---|---|
| KR | 1020180031618 | 3/2018 |
| KR | 20190032007 | 3/2019 |
| KR | 1020200039545 | 4/2020 |

* cited by examiner

[FIG. 1]
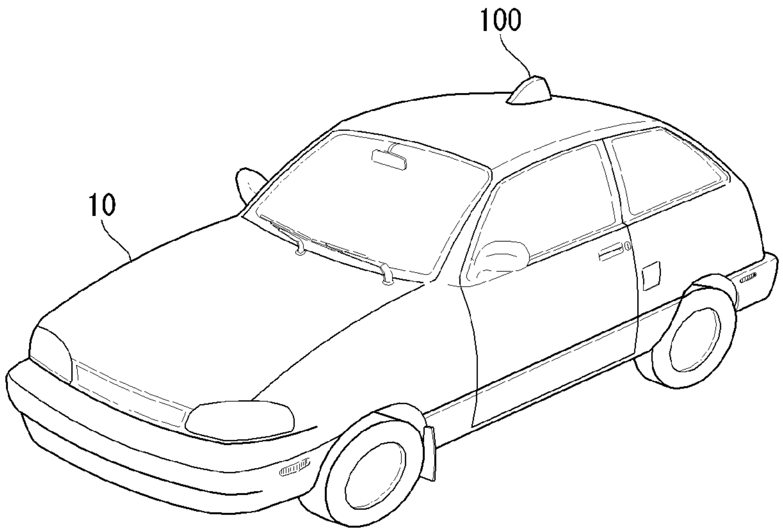
[FIG. 2]
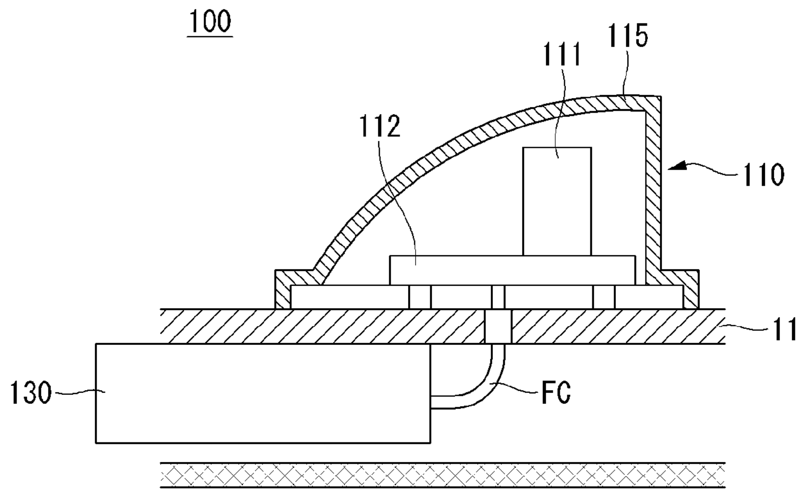

[FIG. 3]
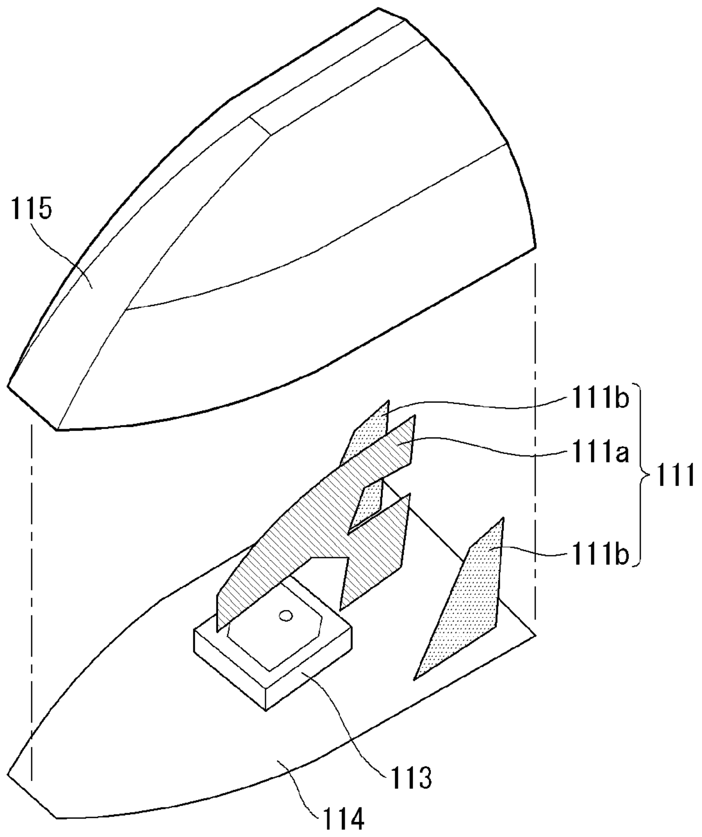
[FIG. 4]
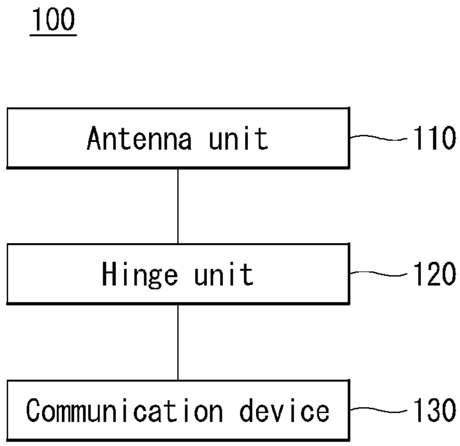

[FIG. 5]
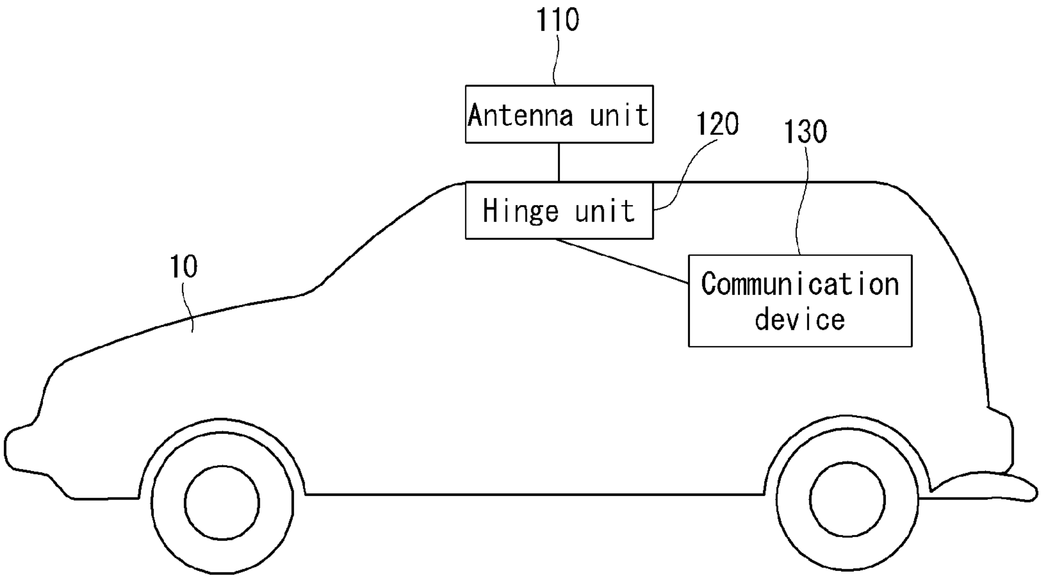
[FIG. 6]
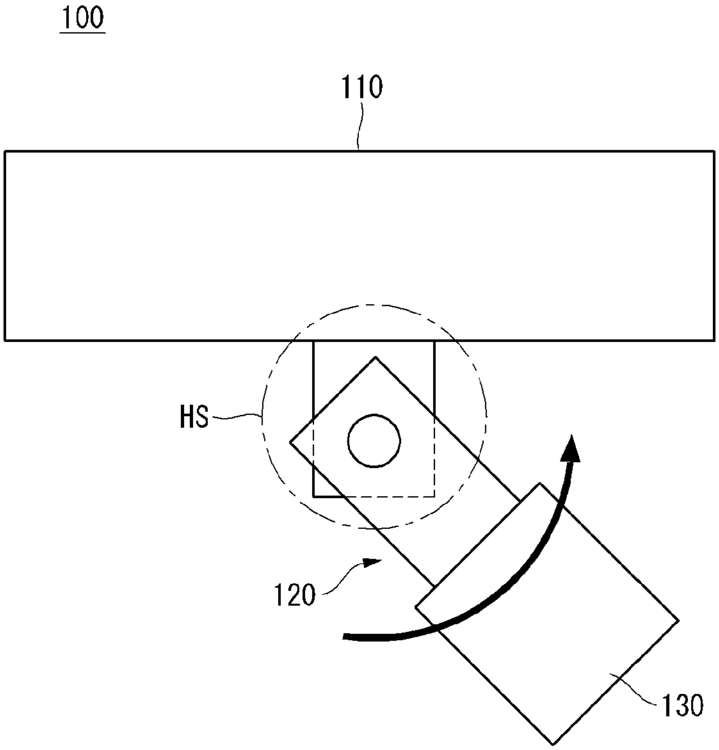

[FIG. 7]
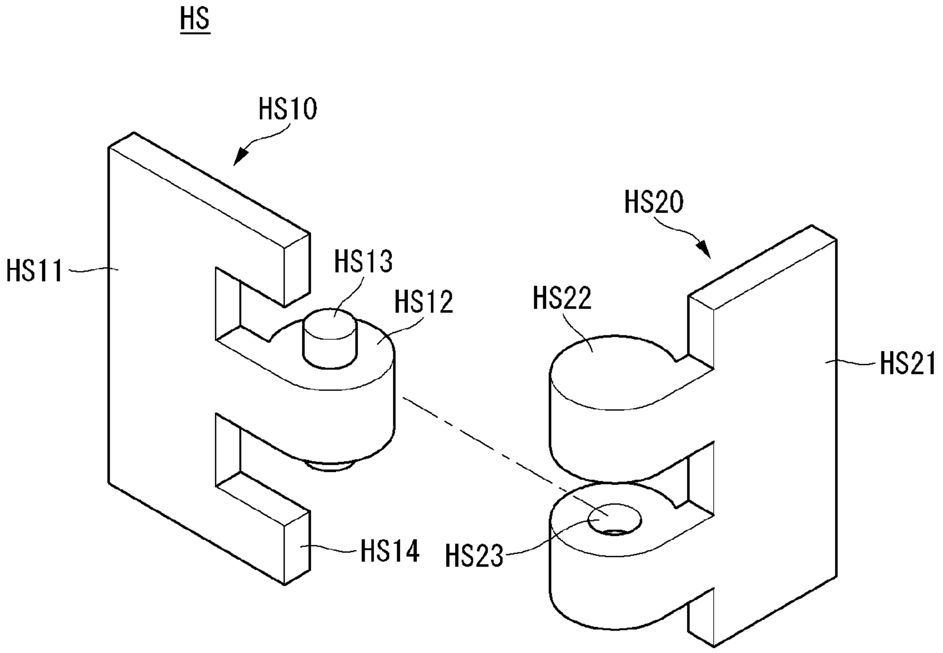

[FIG. 8]
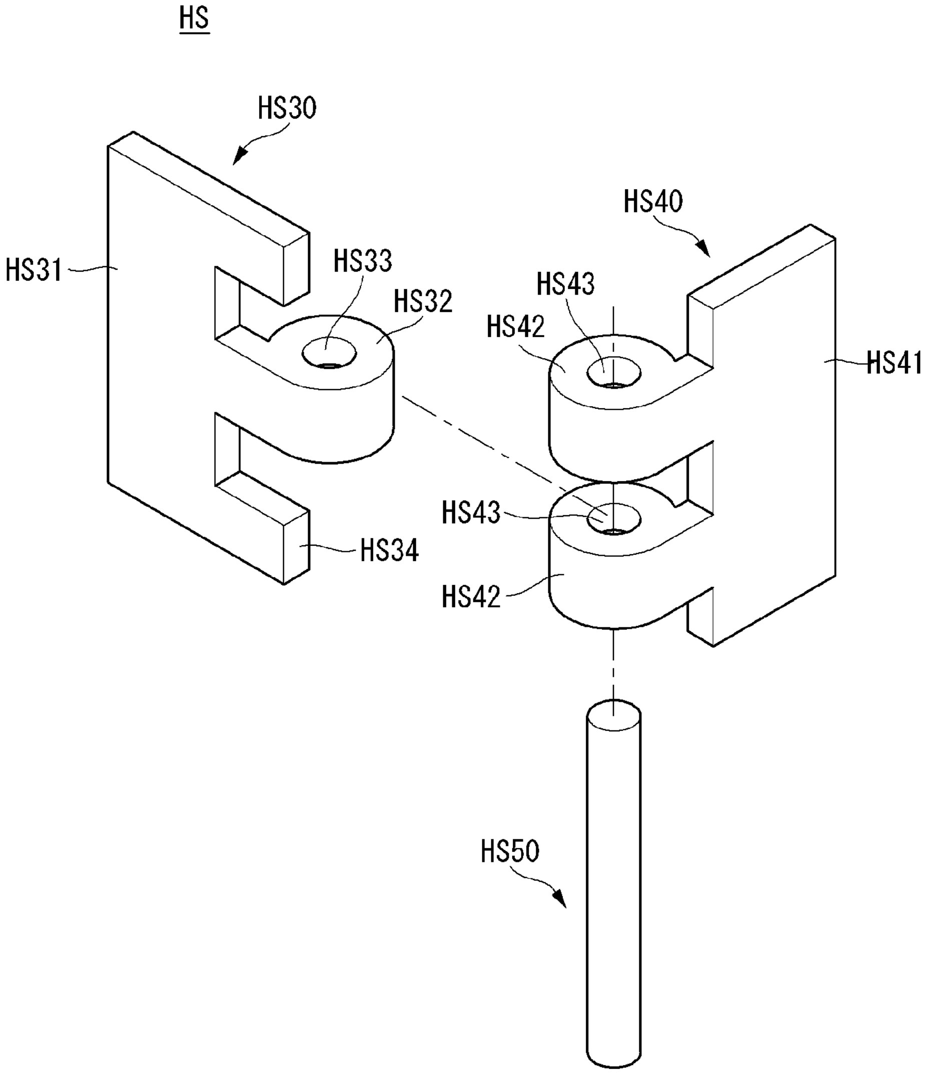

[FIG. 9]
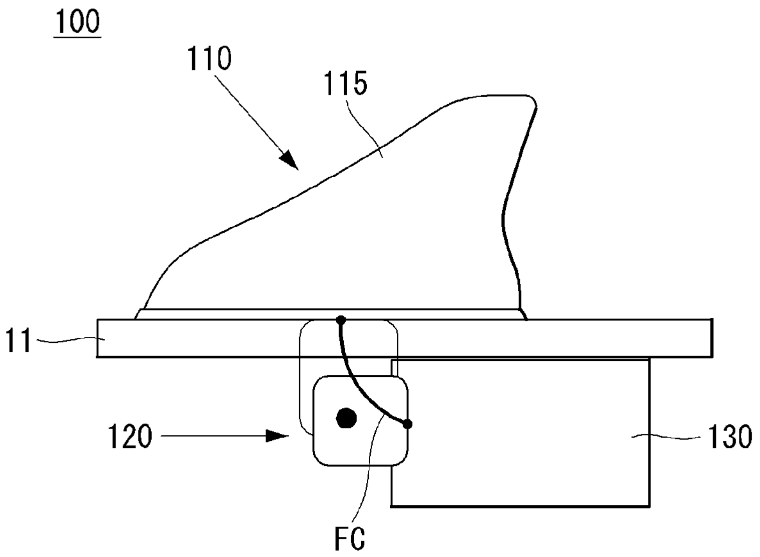

[FIG. 10]
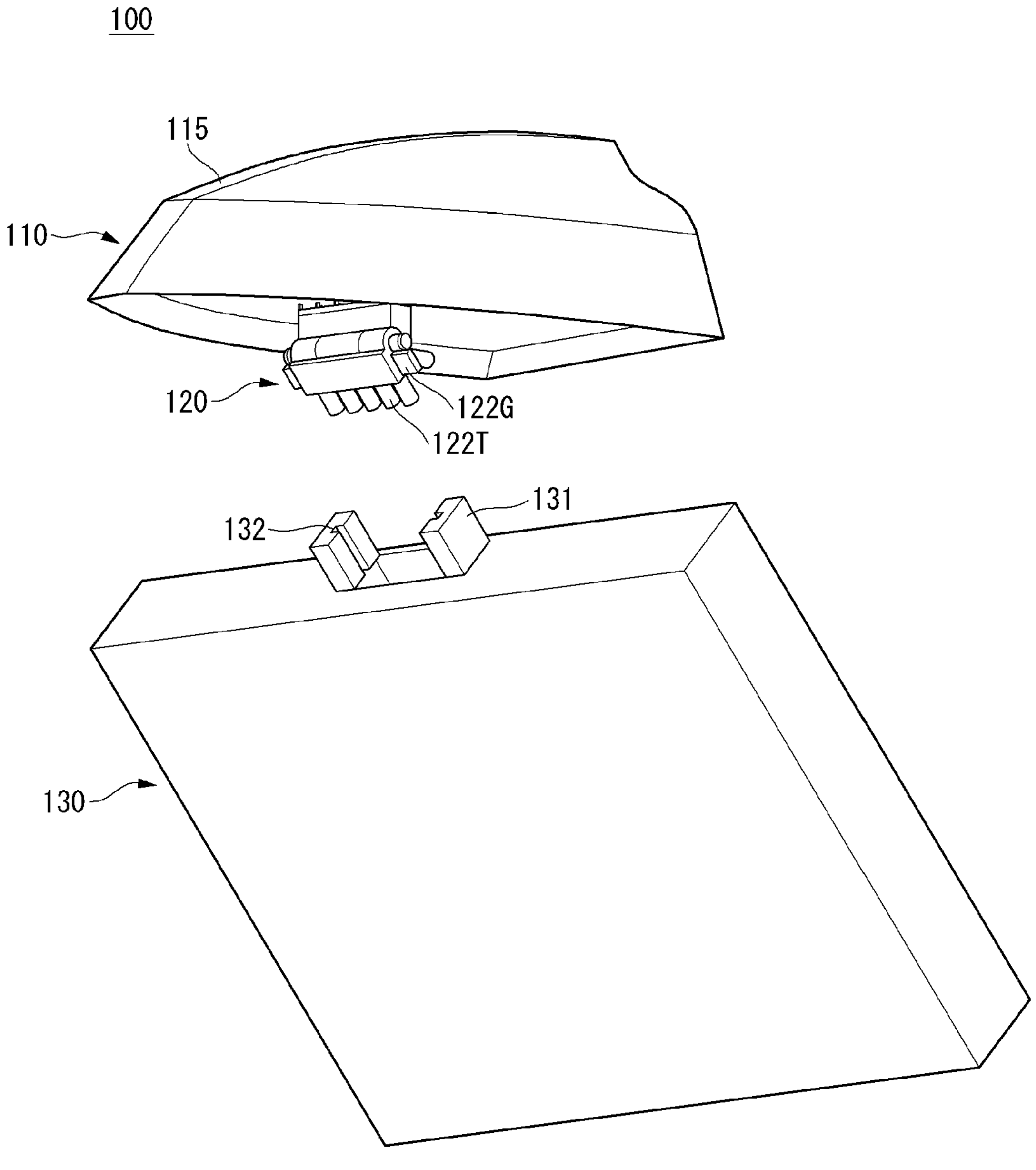

[FIG. 11]
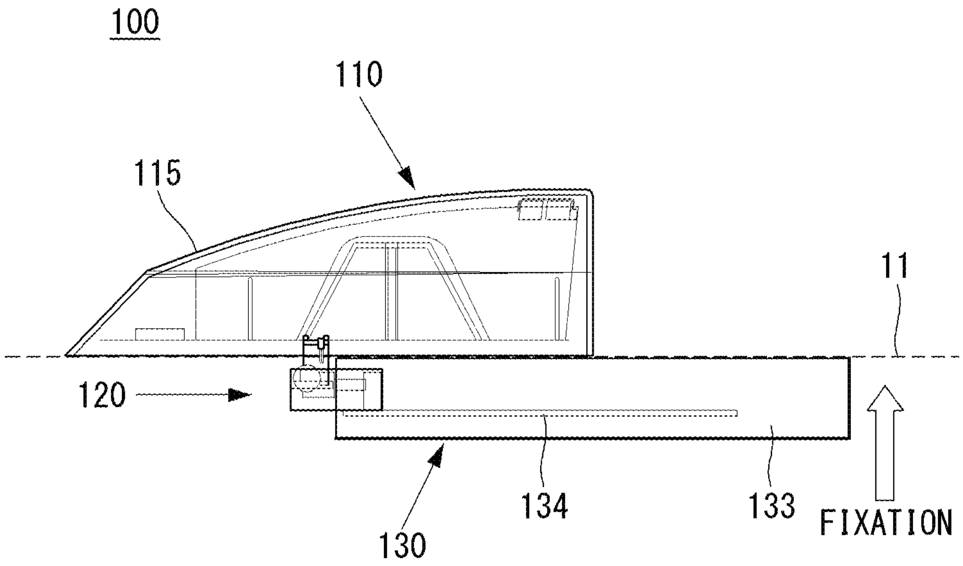
[FIG. 12]
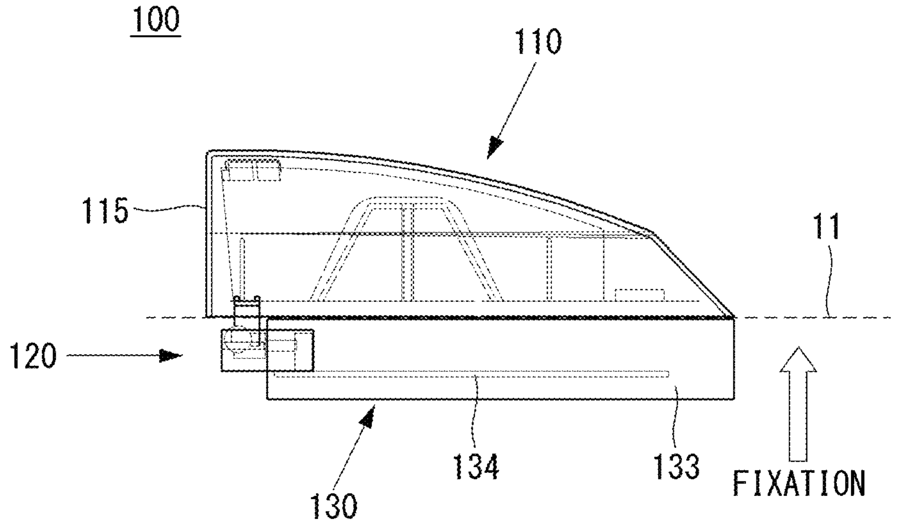

[FIG. 13]
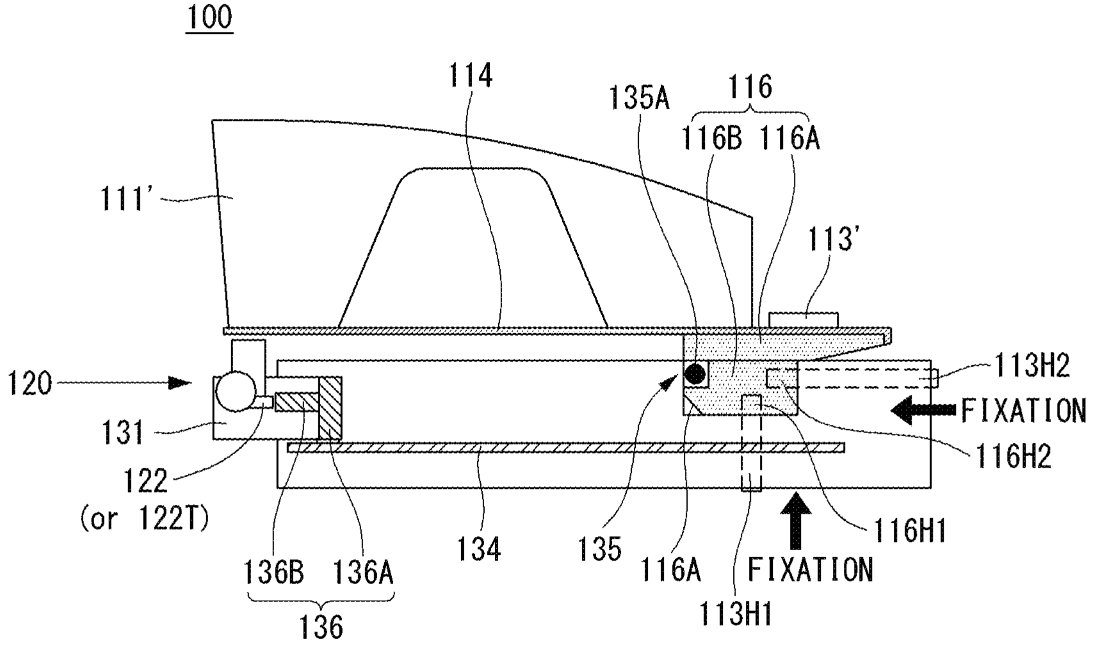
[FIG. 14]
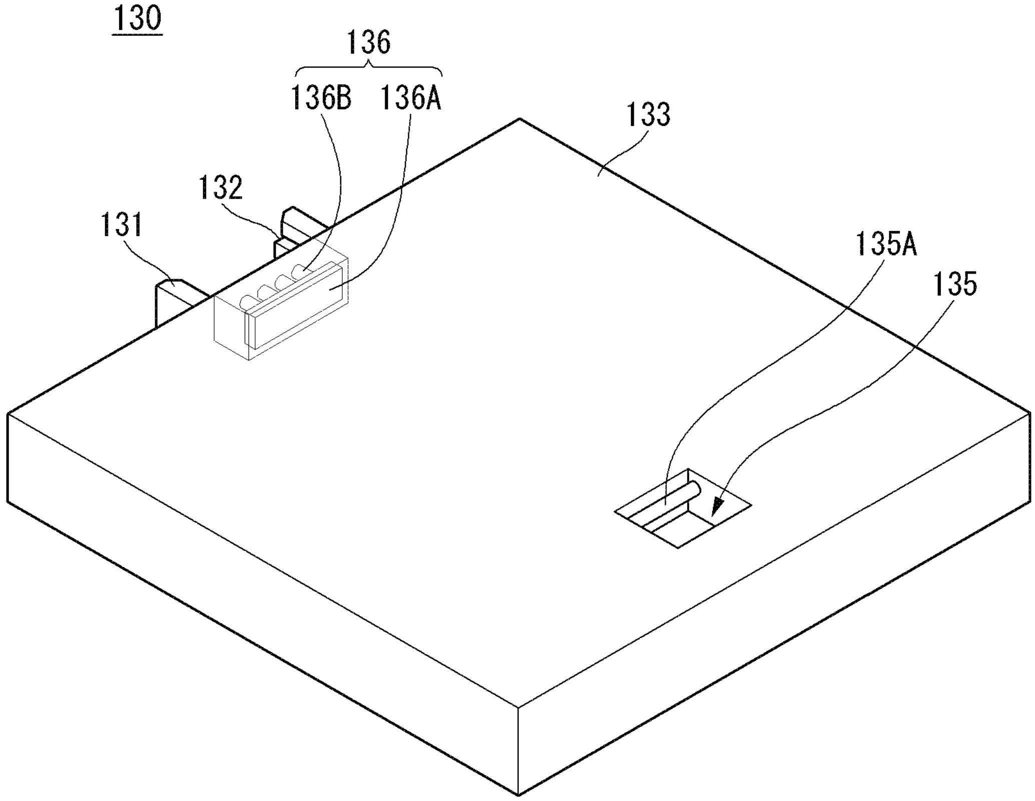

[FIG. 15]
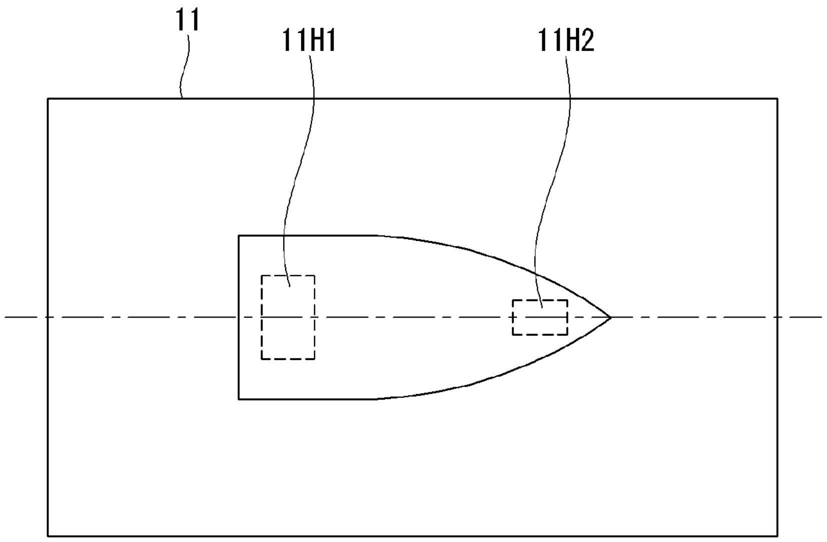
[FIG. 16]
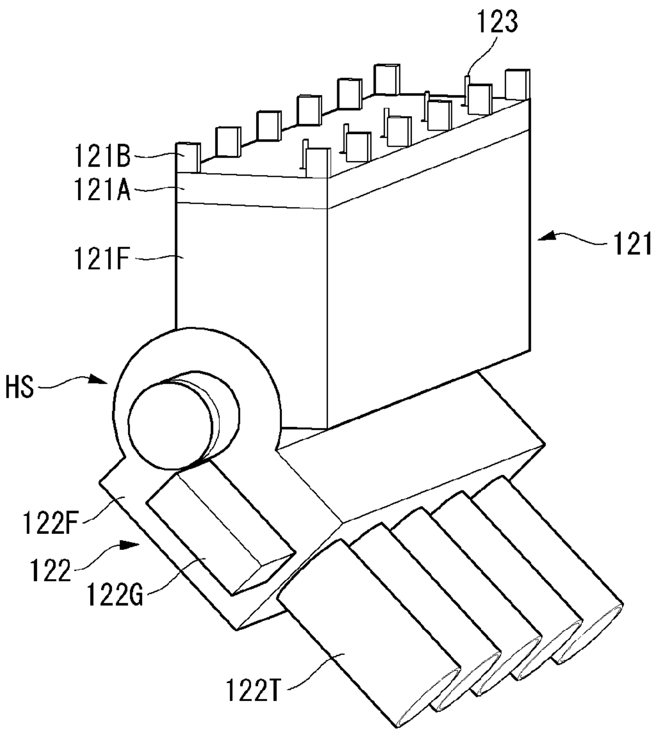

[FIG. 17]
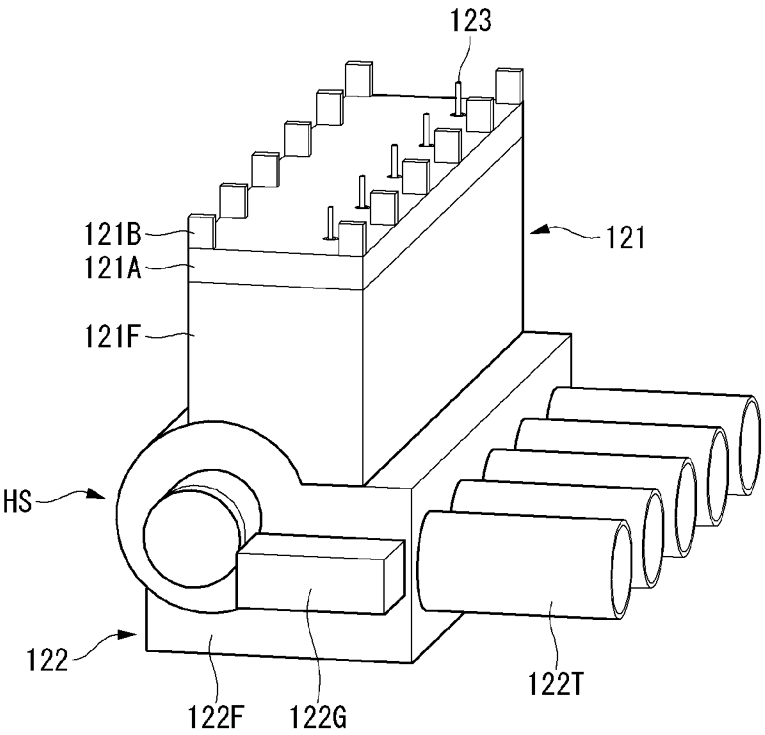

[FIG. 18]
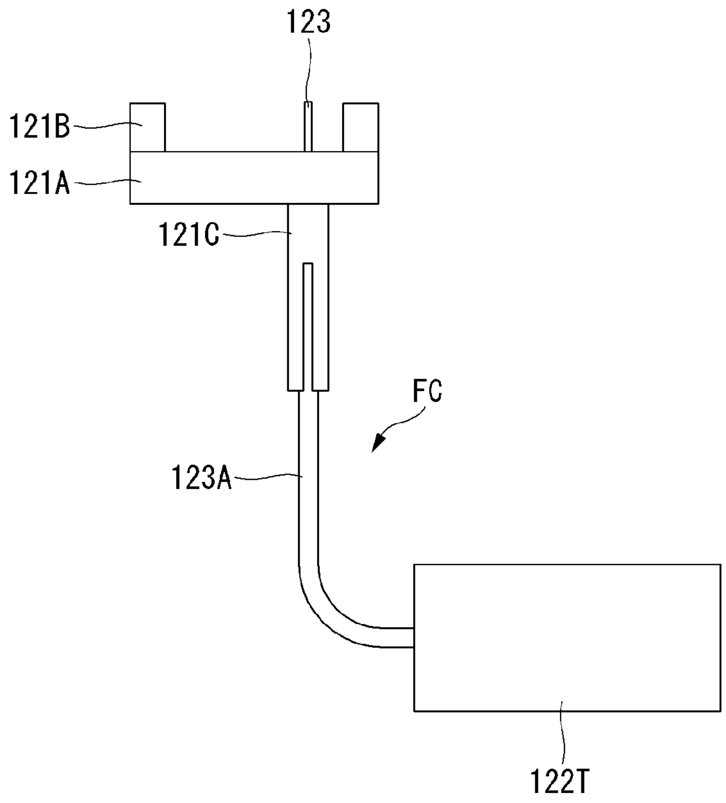

[FIG. 19]
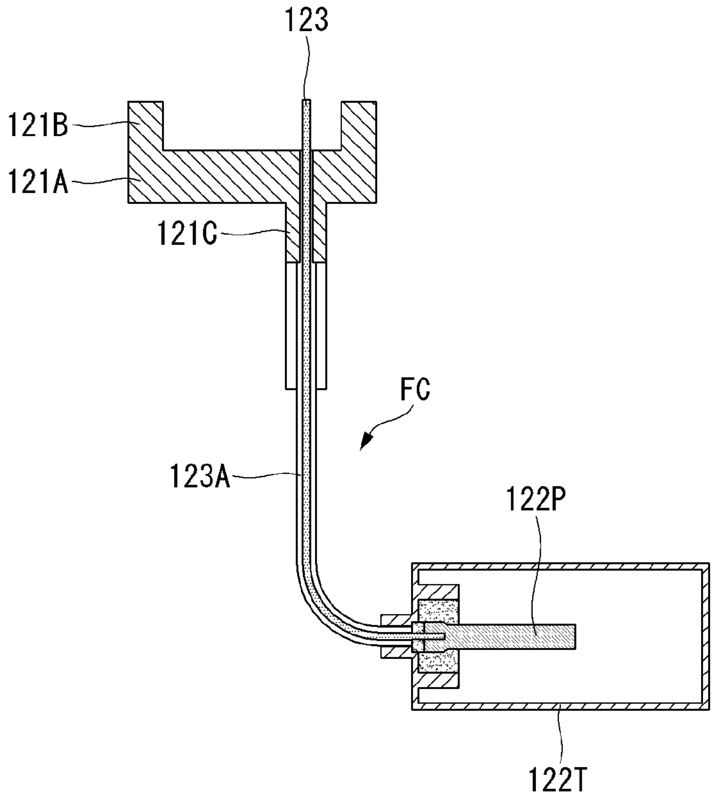
[FIG. 20]
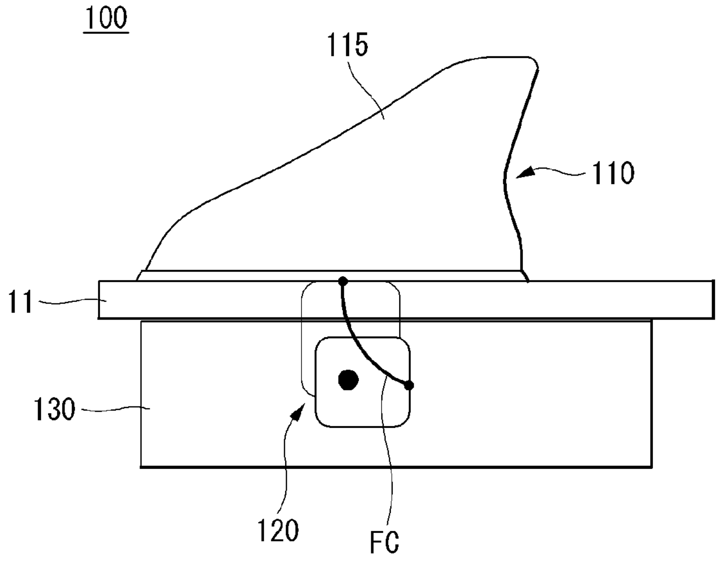

[FIG. 21]
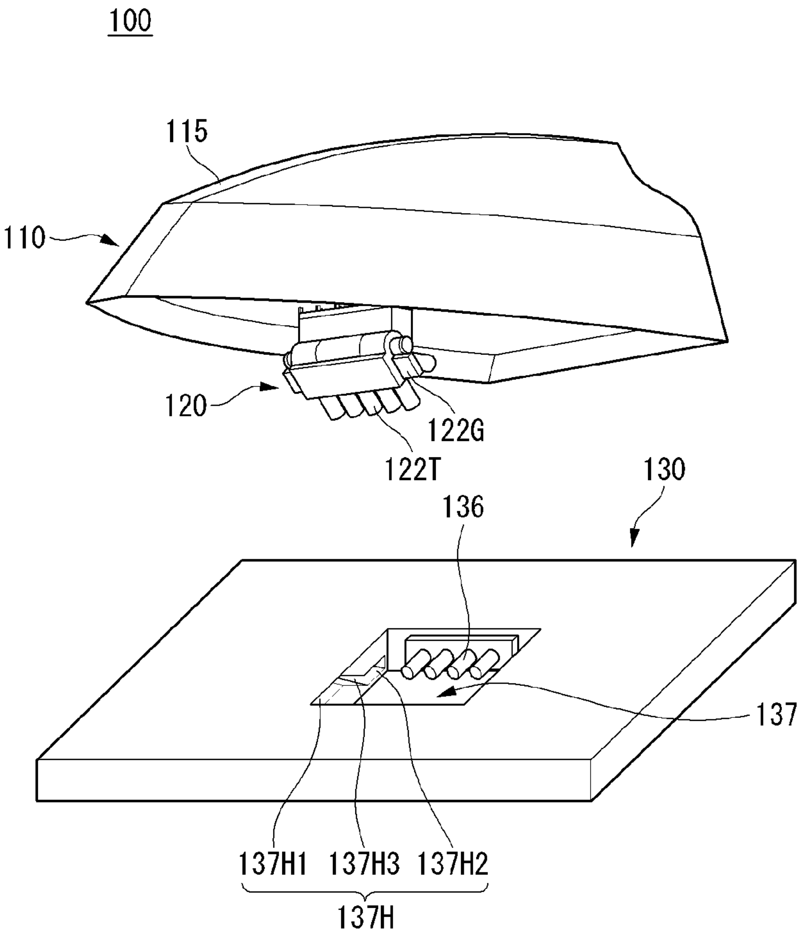

[FIG. 22]
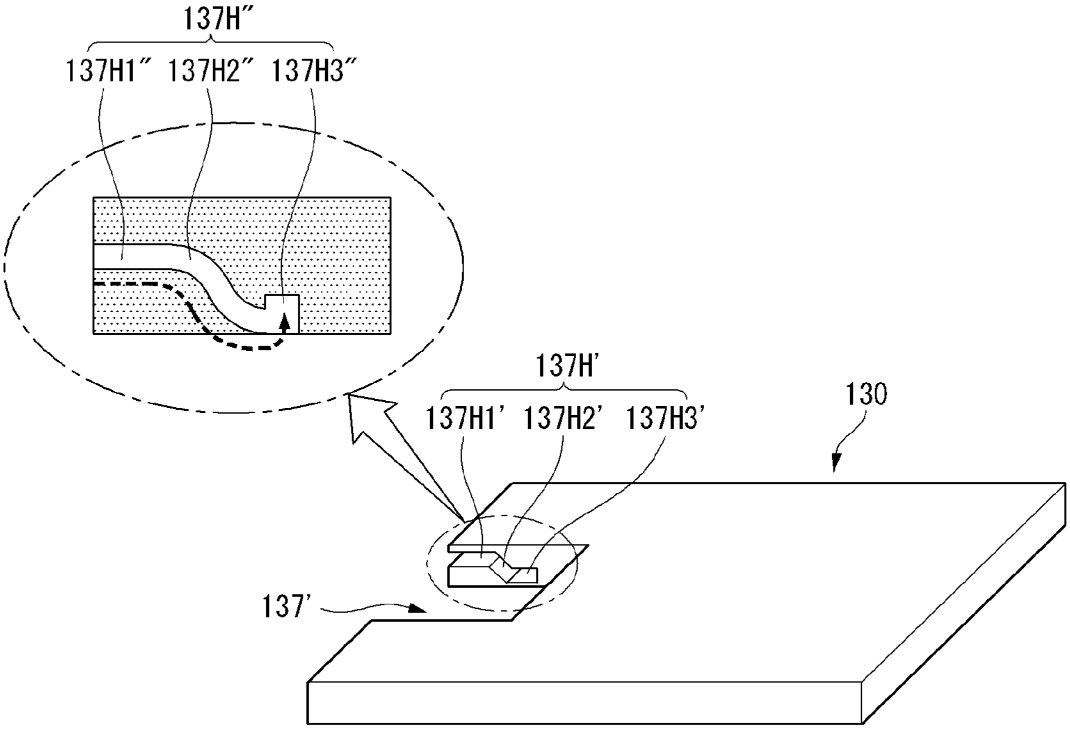
[FIG. 23]
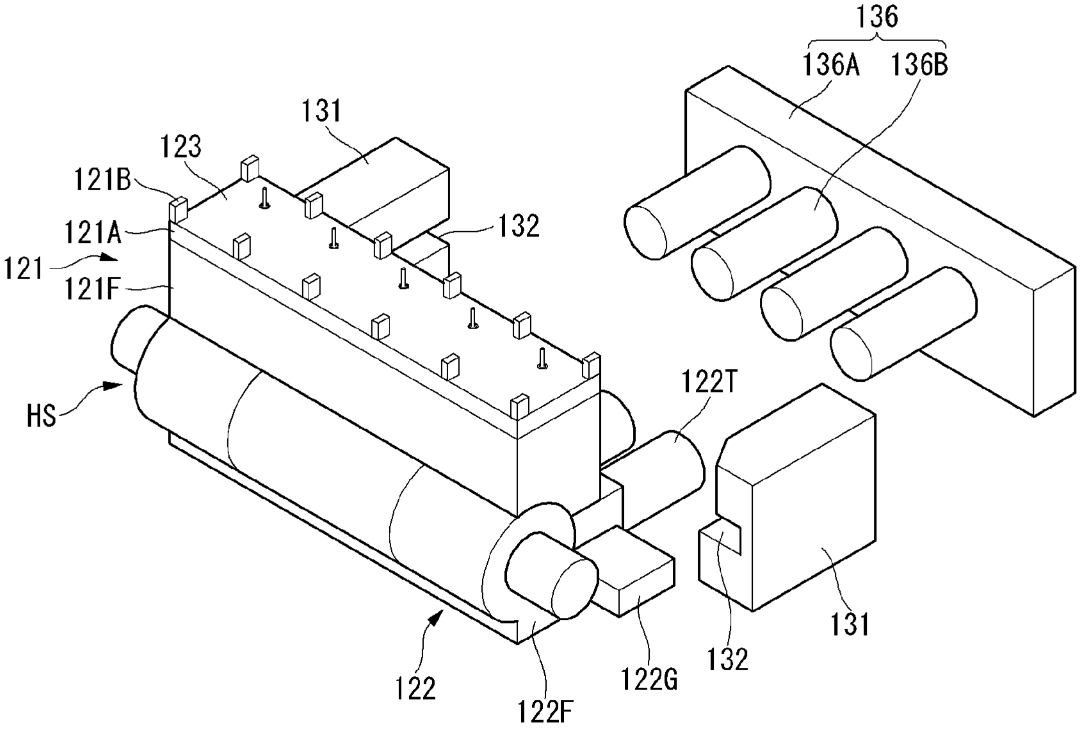

[FIG. 24]
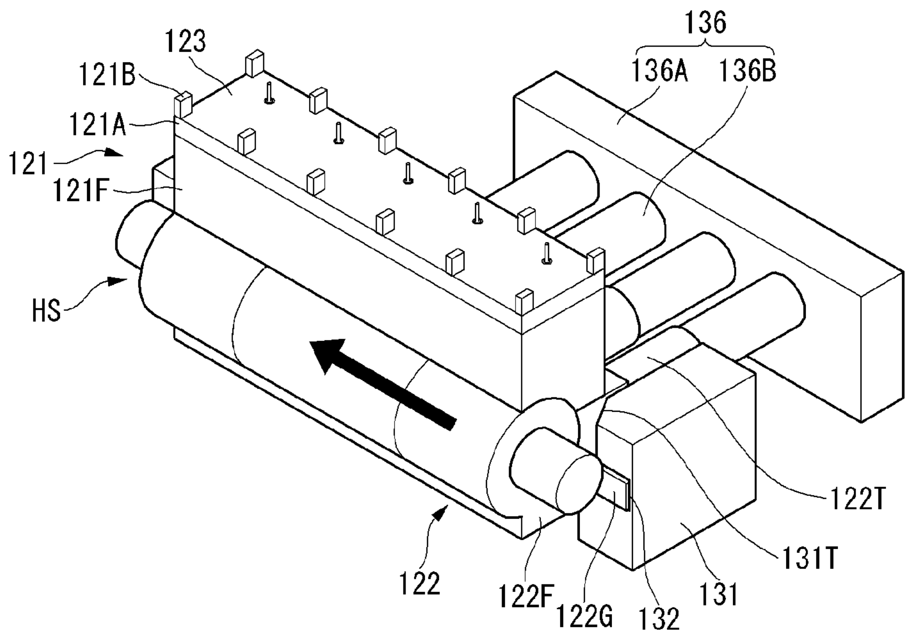
[FIG. 25]
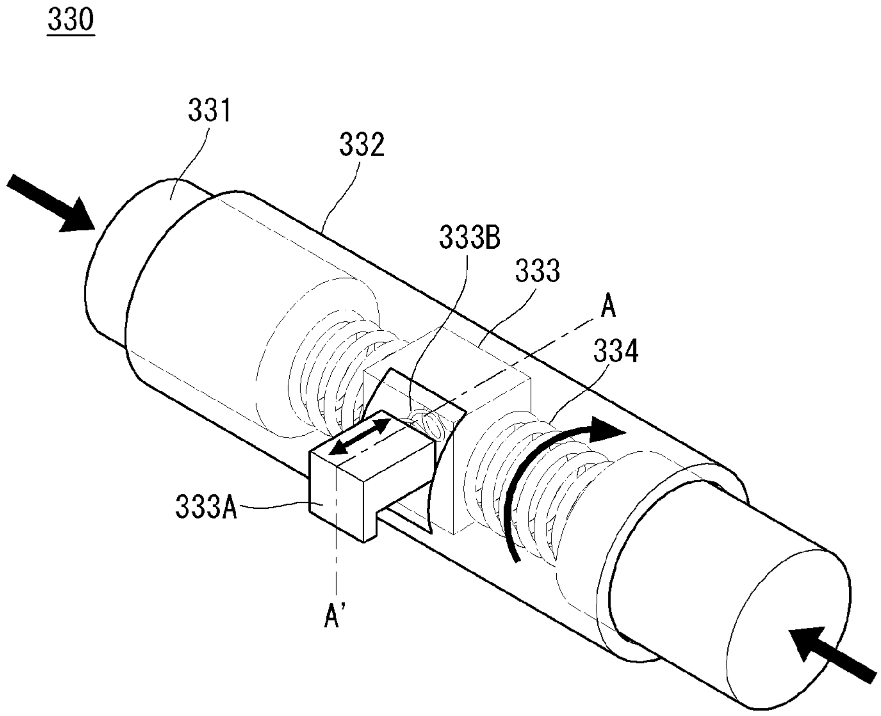

[FIG. 26]
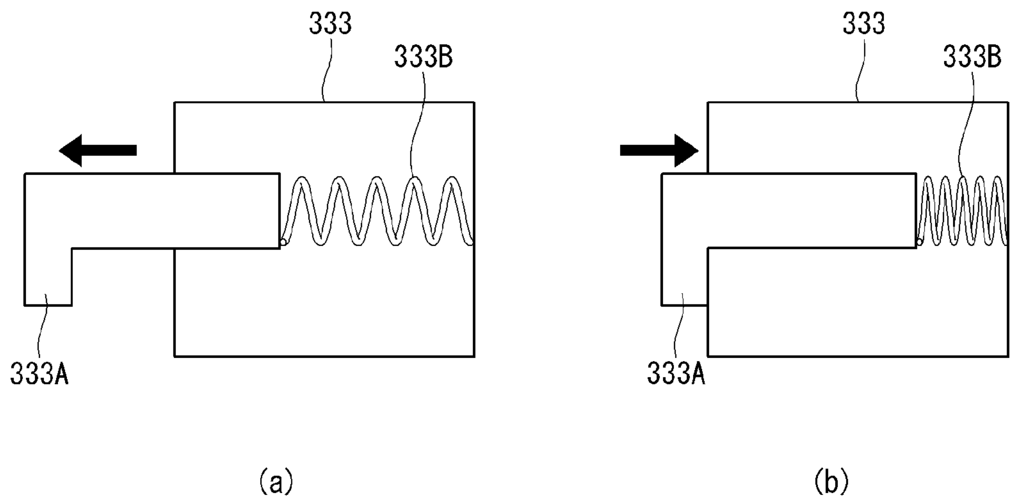

[FIG. 27]
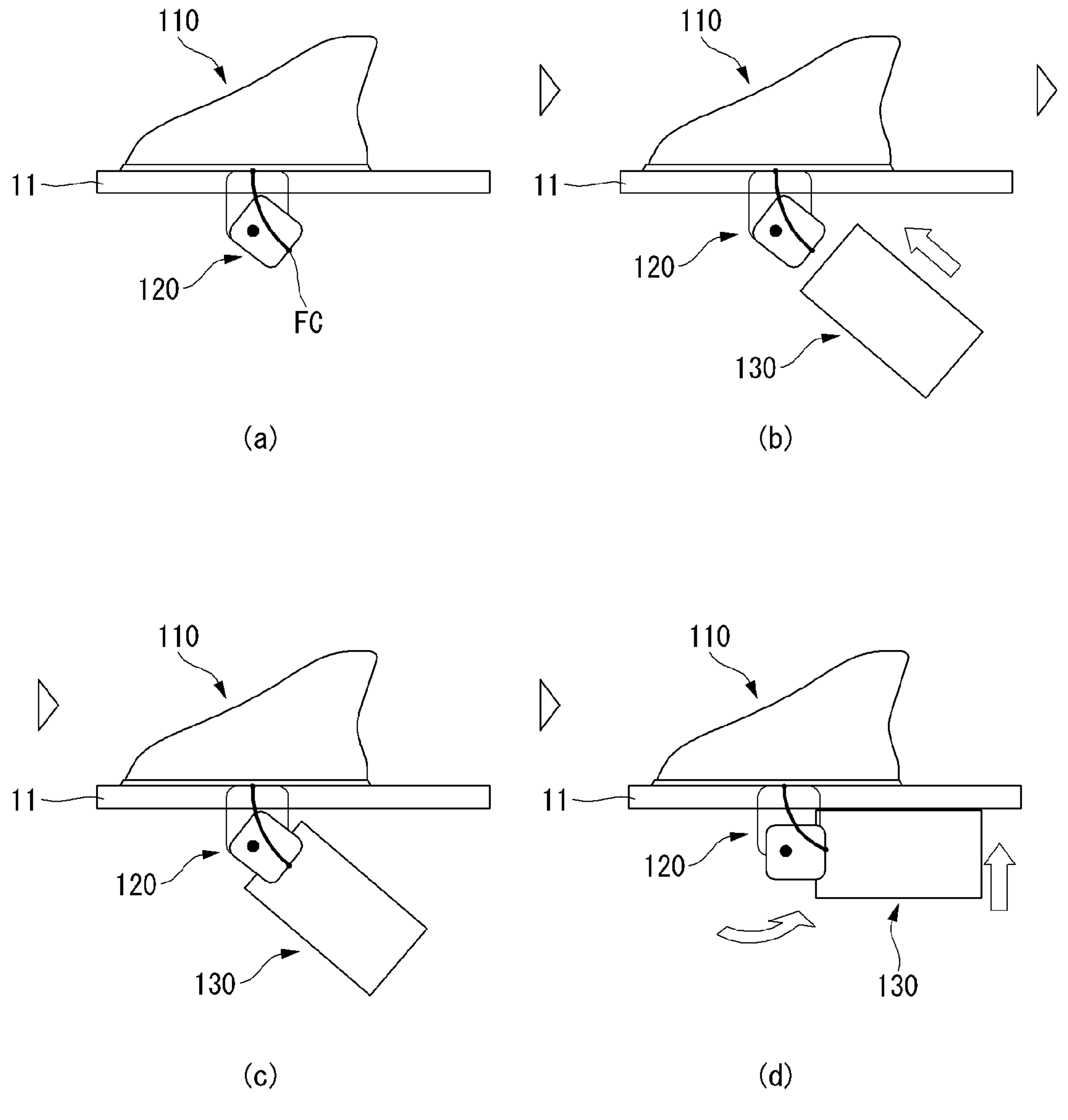

[FIG. 28]
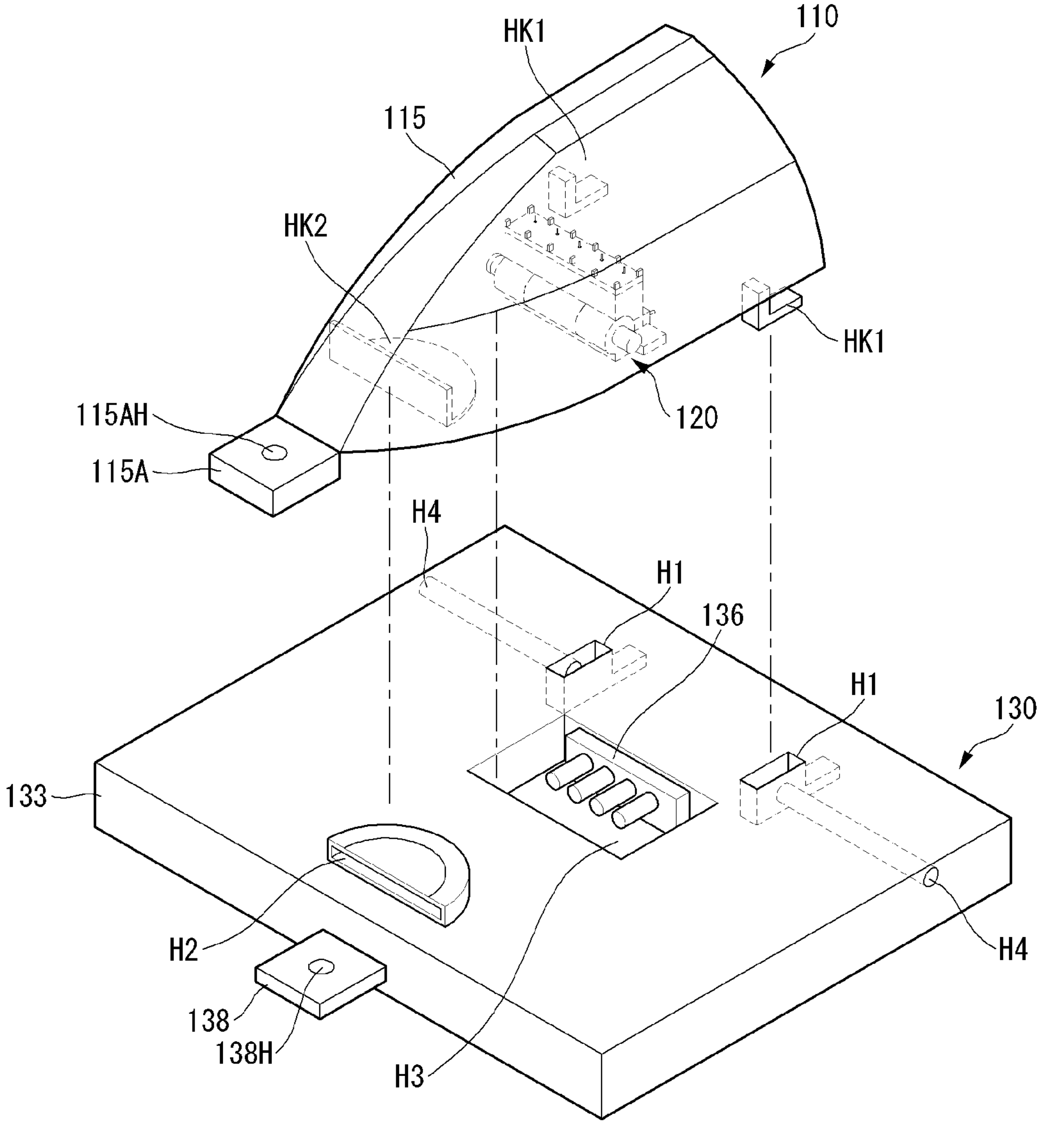

[FIG. 29]
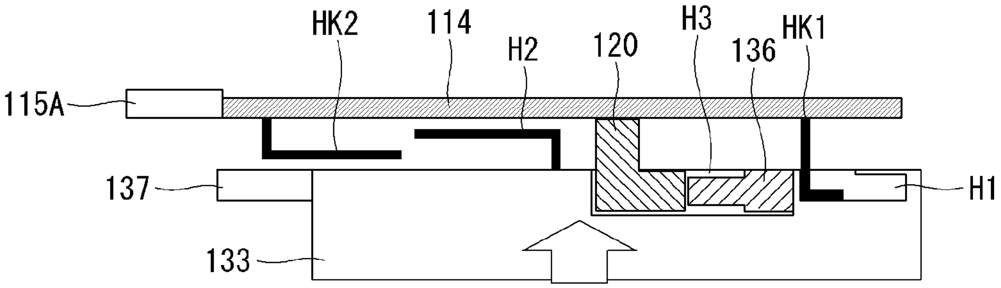
[FIG. 30]
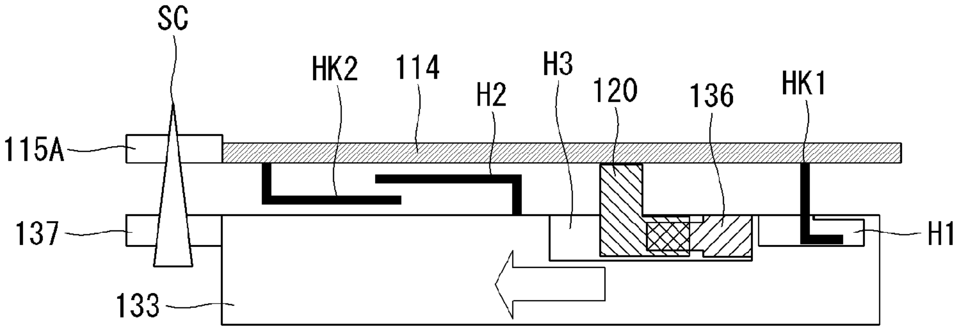
[FIG. 31]
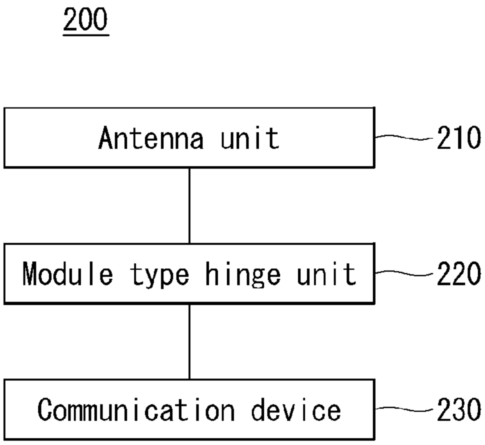

[FIG. 32]
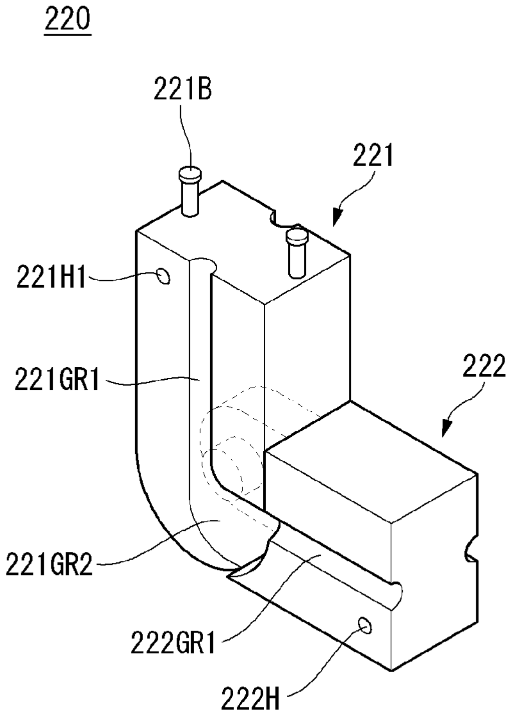

[FIG. 33]
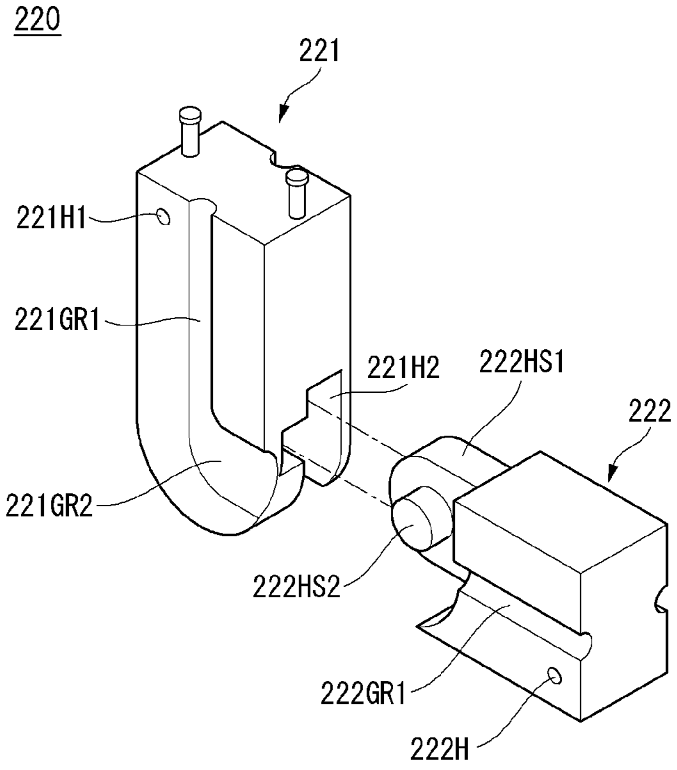

[FIG. 34]
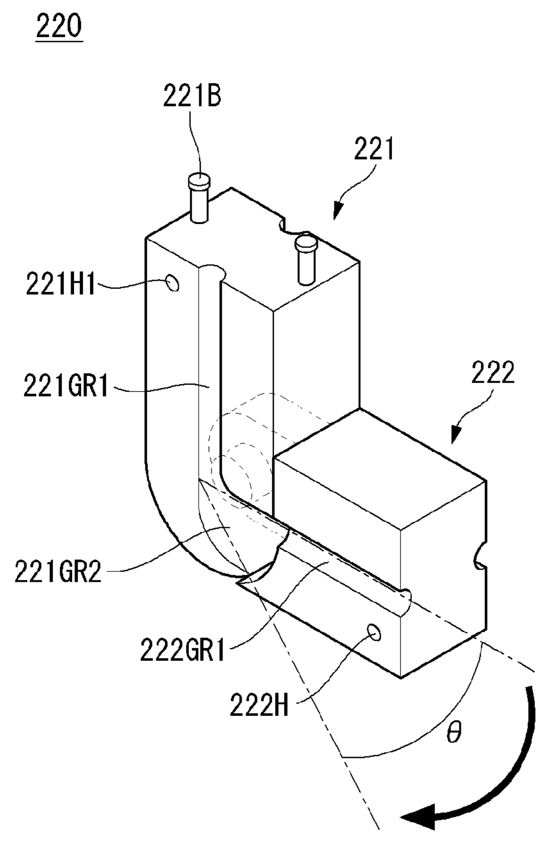

[FIG. 35]
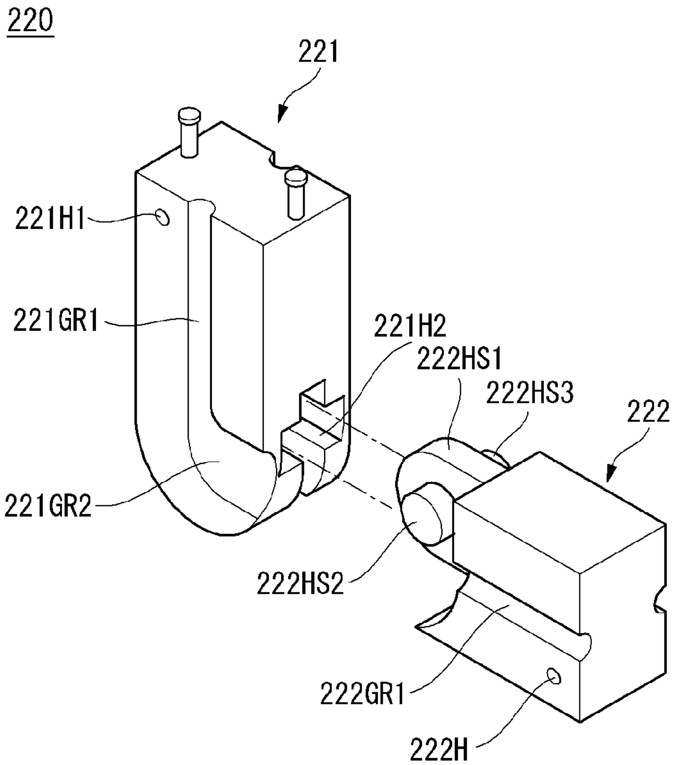

[FIG. 36]
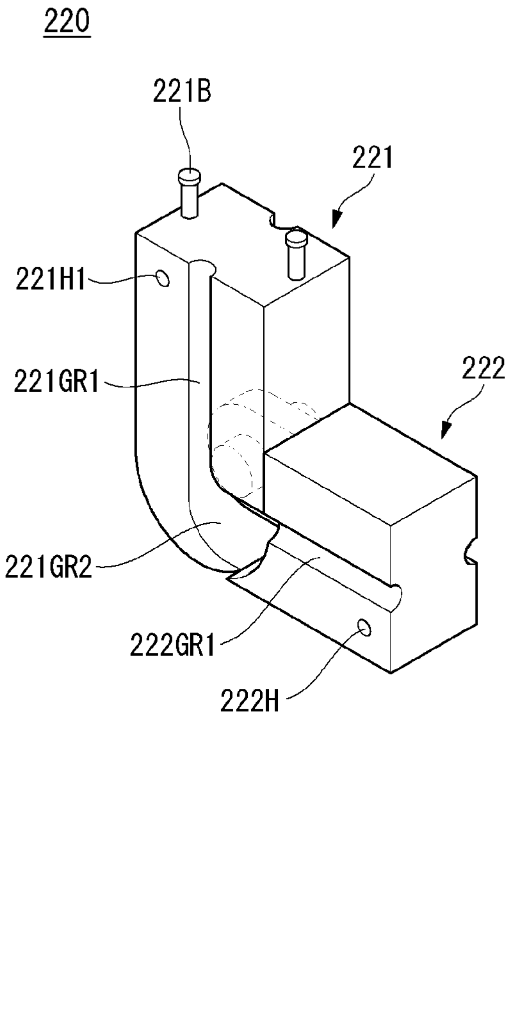

[FIG. 37]
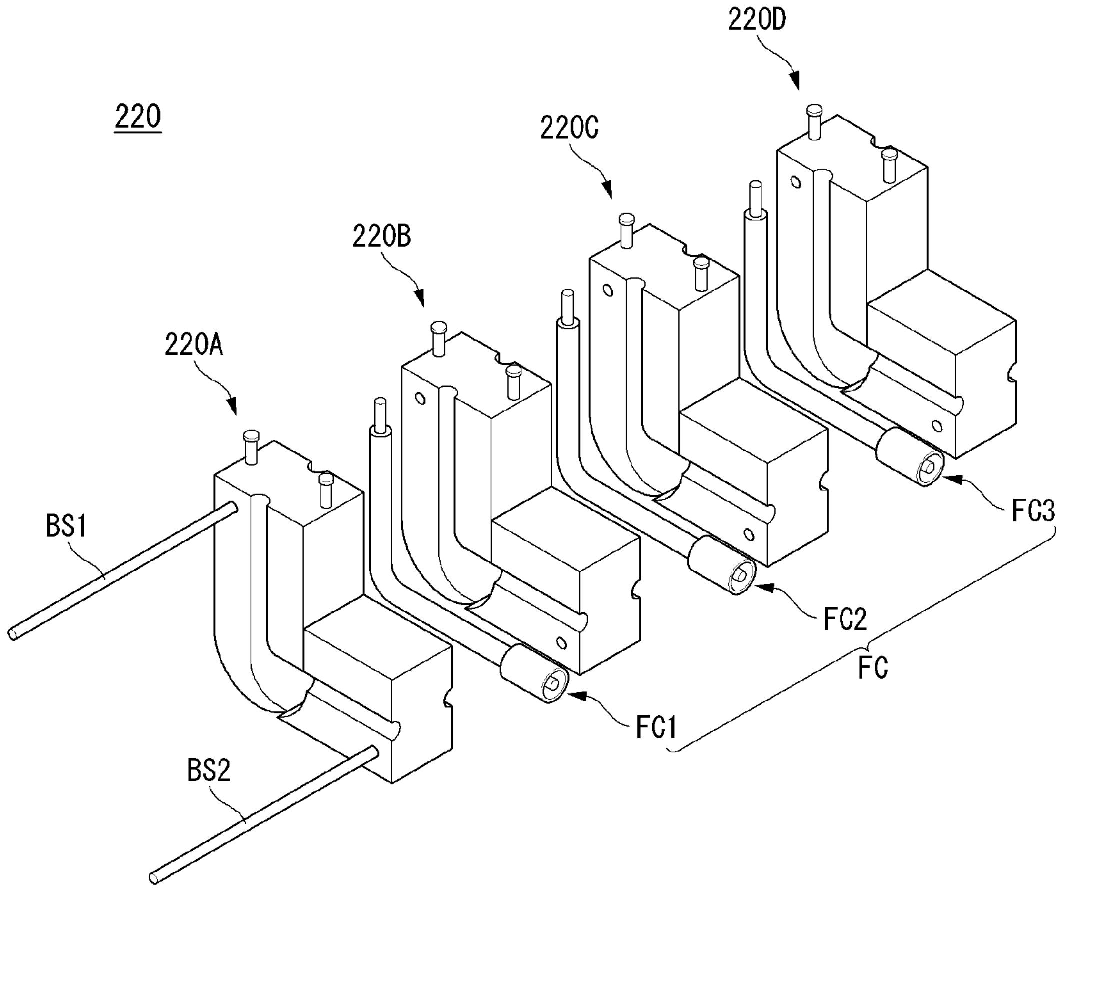

[FIG. 38]
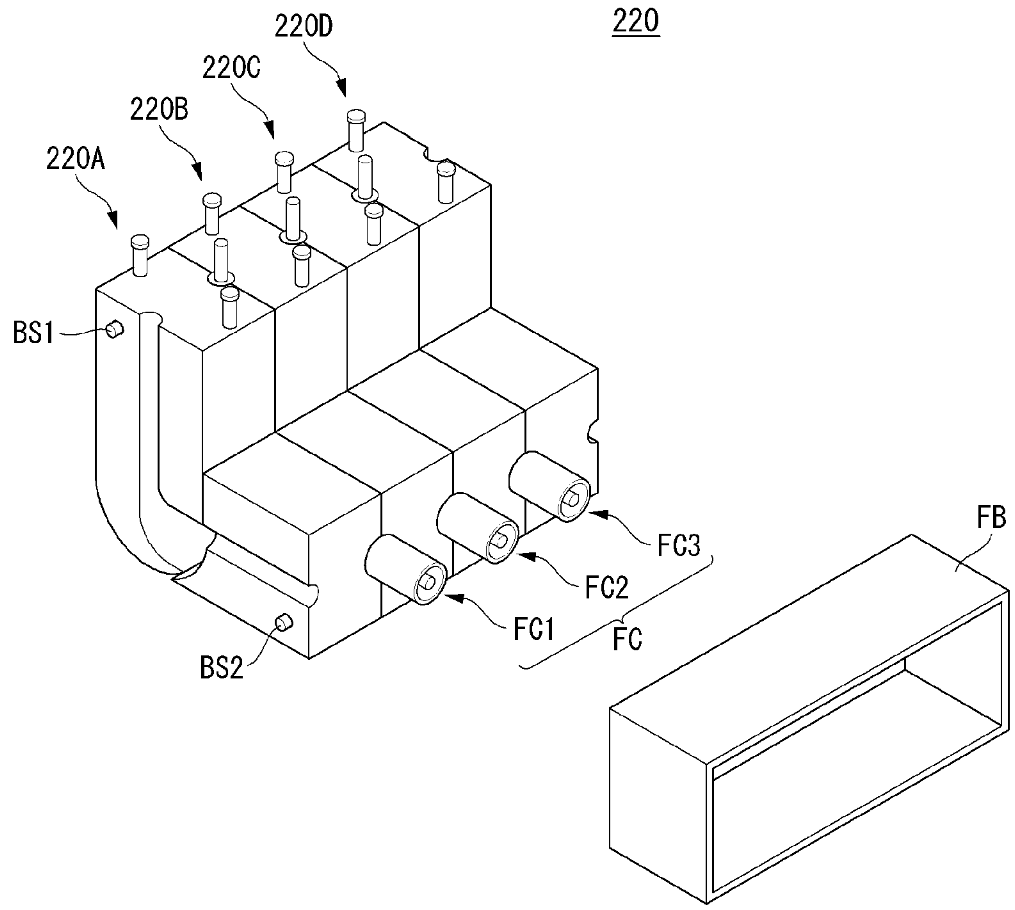

[FIG. 39]
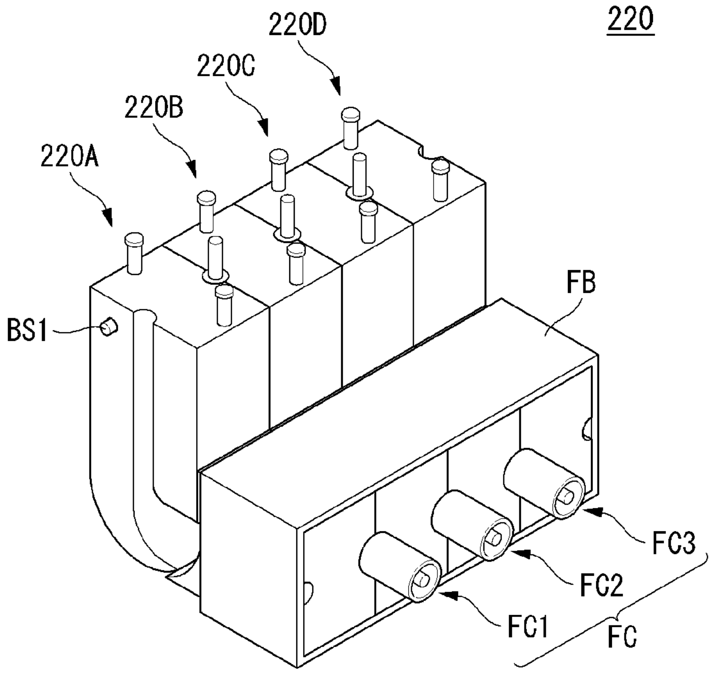
[FIG. 40]
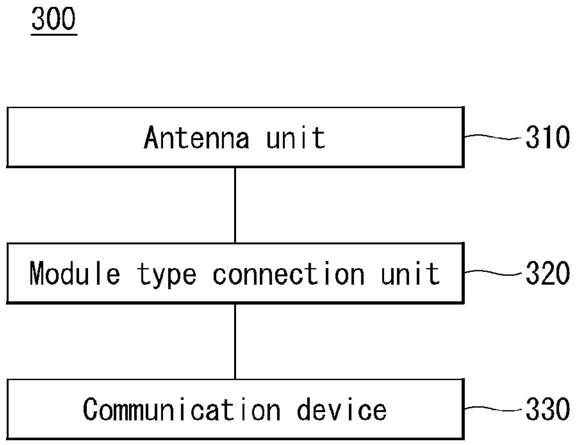

[FIG. 41]
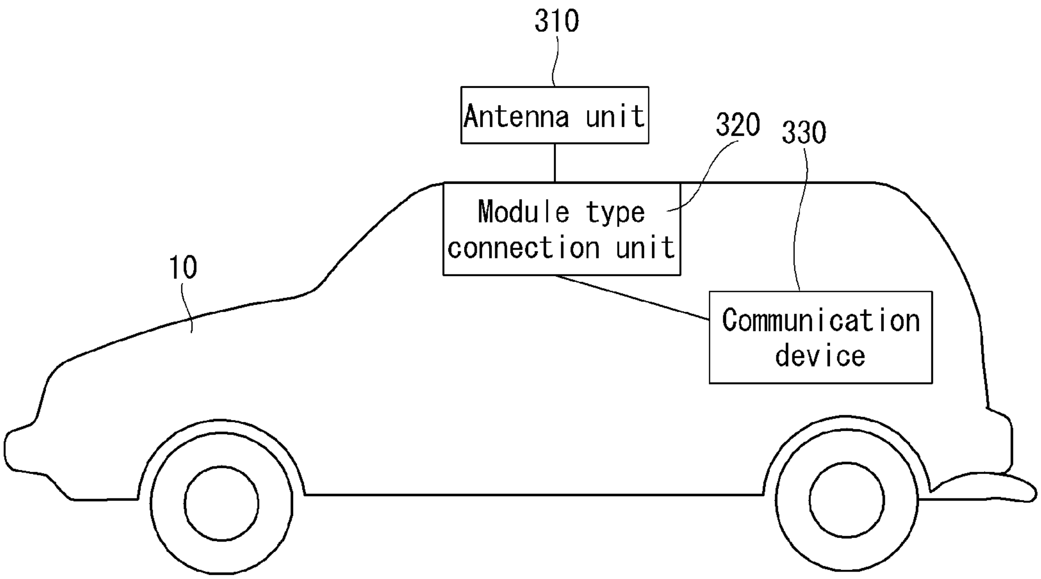

[FIG. 42]
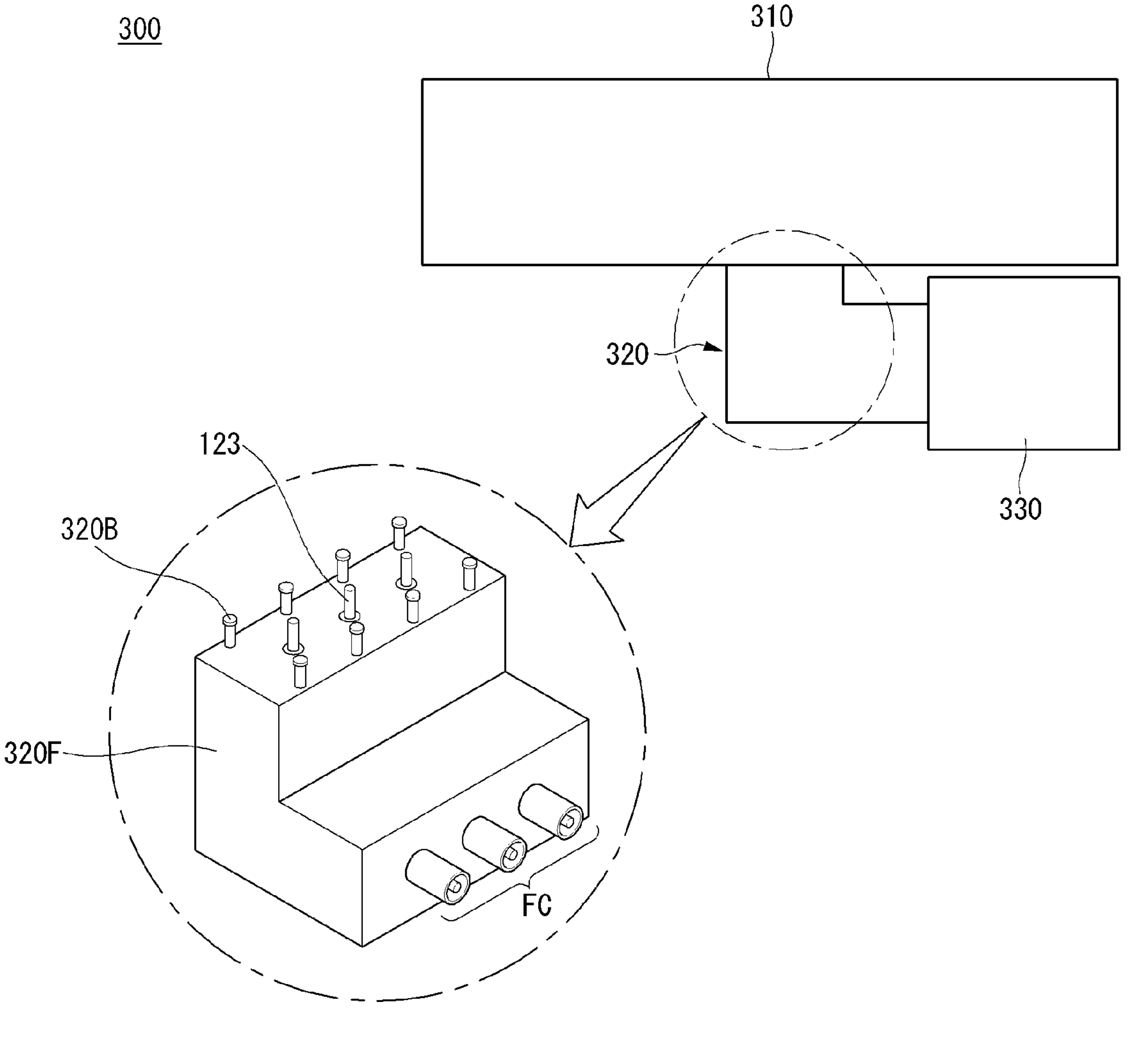

[FIG. 43]
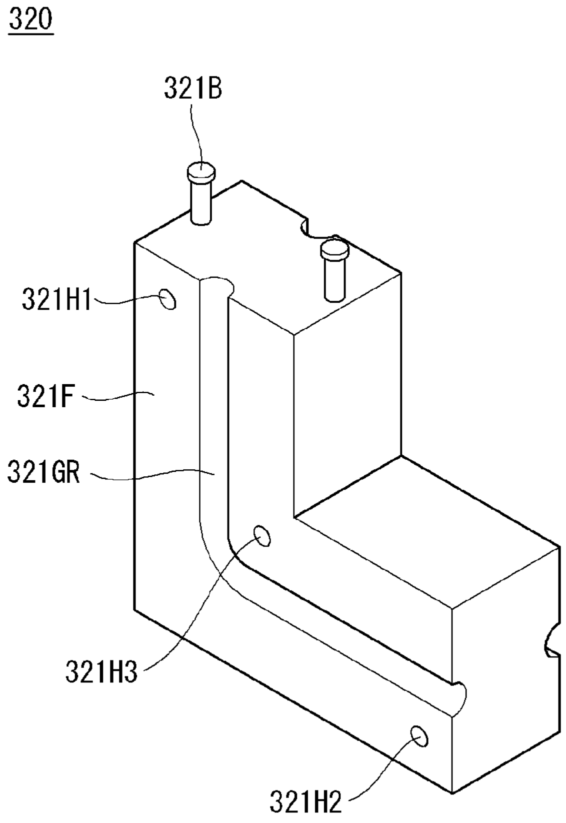

[FIG. 44]
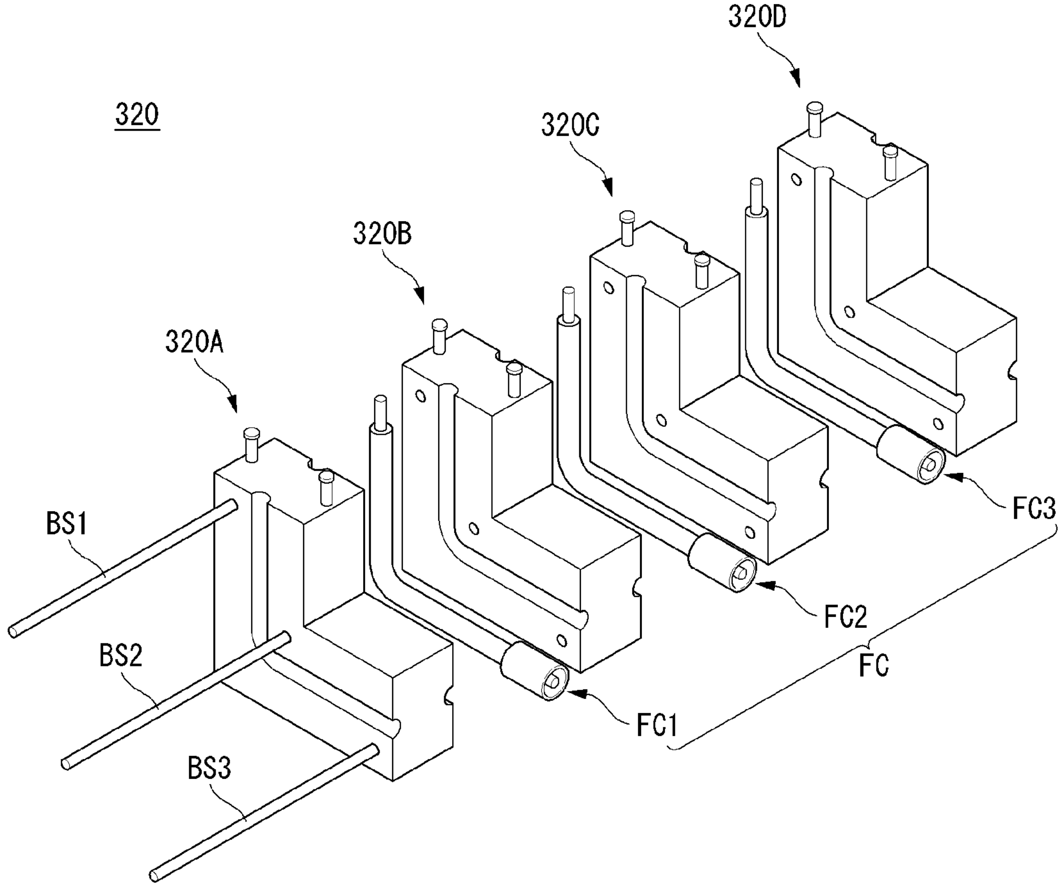

[FIG. 45]
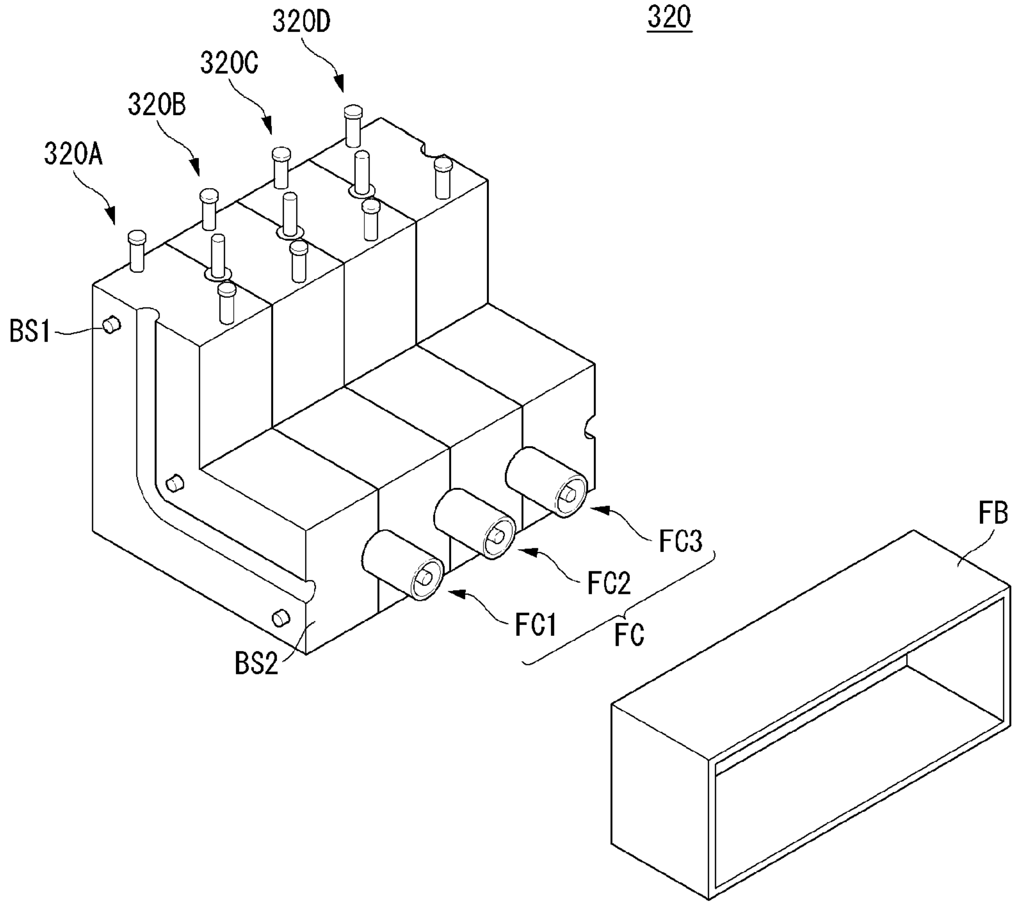

[FIG. 46]
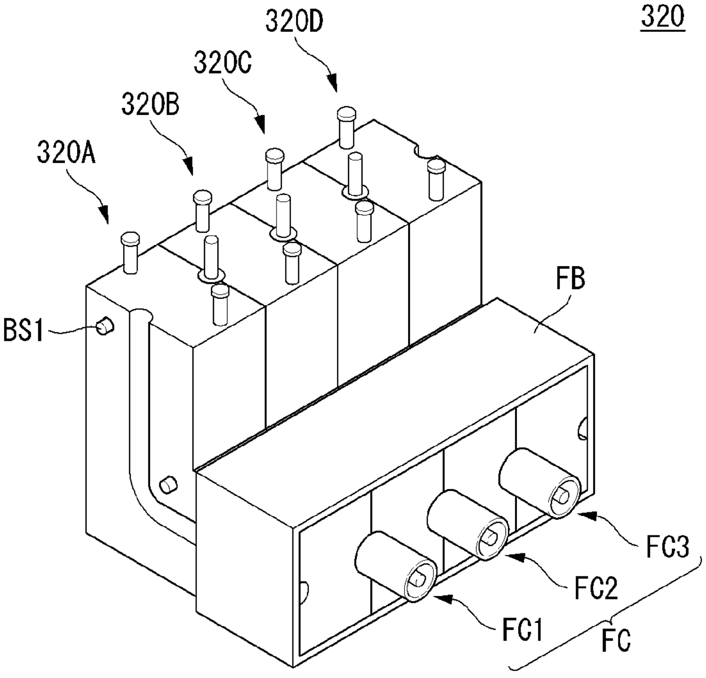

[FIG. 47]
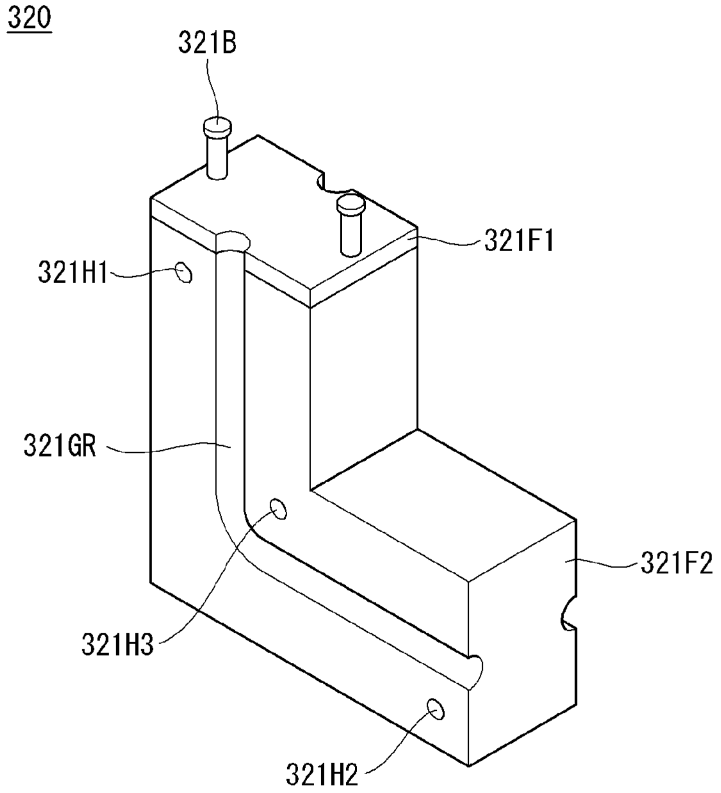

[FIG. 48]
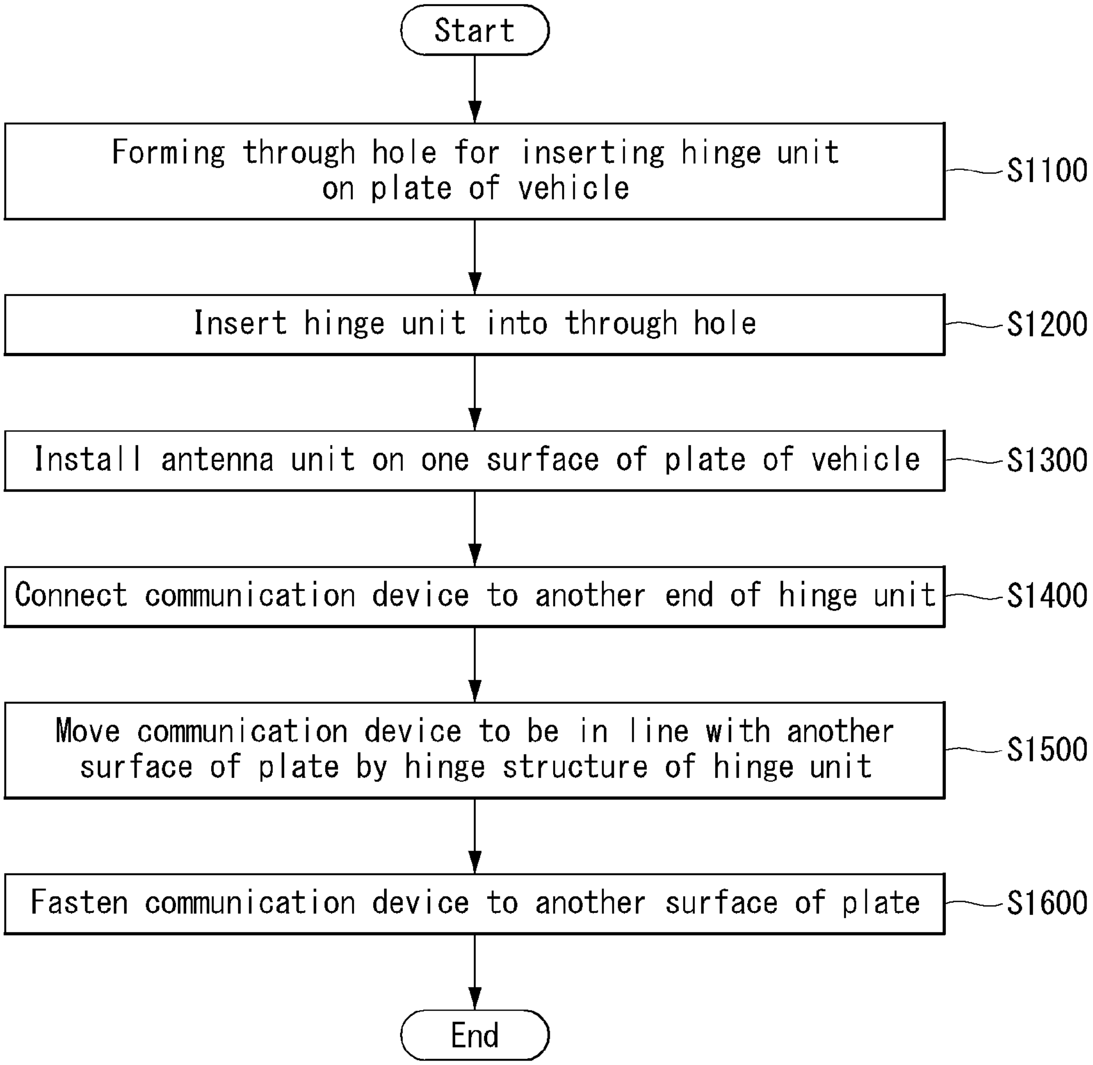

ANTENNA ASSEMBLY, VEHICLE COMPRISING ANTENNA ASSEMBLY, AND METHOD FOR INSTALLING ANTENNA ASSEMBLY ON VEHICLE

CROSS-REFERENCE TO RELATED APPLICATIONS

This application is the National Stage filing under 35 U.S.C. 371 of International Application No. PCT/KR2020/007608, filed on Jun. 11, 2020, the contents of which are all incorporated by reference herein in their entirety.

TECHNICAL FIELD

The present disclosure relates to an antenna assembly, a vehicle comprising the antenna assembly, and a method for installing the antenna assembly on the vehicle, and particularly, to a coupling structure for coupling a vehicular antenna assembly to a vehicle and an installation method thereof.

BACKGROUND ART

In recent years, as vehicular communication technology has been developed, there is a growing interest in a vehicular antenna to support various wireless communication services such as DMB, GPS, and mobile communication on the vehicle in addition to a radio frequency signal such as AM/FM.

The vehicular antenna is provided in the form of an external antenna to receive the signal of the DMB or GPS band, and in particular, in recent years, the external antenna with a housing body having a substantially shark fin form has been widely used by considering air resistance.

With respect to the conventional vehicular shark fin antenna, a wiring work is not easy, and it is difficult to stably and easily install the shark fin antenna on the vehicle.

Further, since the conventional vehicular shark fin antenna requires an RF cable having a significant length for communication a communication device, the conventional vehicular shark fin antenna has a problem in that a lot of cost is required, and a signal loss rate is also large.

Therefore, a technology for easily and stably coupling the vehicular shark fin antenna to the vehicle is required. Further, a technology for more efficiently and stably placing the cable of the vehicular shark fin antenna to the vehicle is required.

DISCLOSURE

Technical Problem

The present disclosure has been made in an effort to provide a coupling structure and an installation method of economically and stably mounting an antenna assembly on a vehicle.

Furthermore, the present disclosure has been made in an effort to provide a coupling structure and an installation method which can reduce manufacturing cost through an antenna assembly having a simple structure.

Furthermore, the present disclosure has been made in an effort to provide a coupling structure and an installation method which can solidly mount the antenna assembly on the vehicle by using a hinge structure.

Furthermore, the present disclosure has been made in an effort to provide a coupling structure and an installation method which can easily adjust the number of cables required for mounting the antenna assembly by utilizing a module scheme.

Technical objects to be achieved by the present disclosure are not limited to the aforementioned technical objects, and other technical objects not described above may be evidently understood by a person having ordinary skill in the art to which the present disclosure pertains from the following description.

Technical Solution

In order to solve the problem, an antenna assembly installed on a vehicle, the antenna assembly according to the present disclosure may include: an antenna unit installed on one surface of a plate of the vehicle; a hinge unit which has one end connected to the antenna unit, and penetrates the plate, and includes a hinge structure; and a communication device connected to the other end of the hinge unit.

Further, the hinge unit may include a first hinge unit having one end connected to the antenna unit, and penetrating the plate, a second hinge unit connected to the first hinge unit, and connected to the communication device, and a hinge structure for rotary motions of the first hinge unit and the second hinge unit.

Further, the hinge structure may include a rotary axis connecting the first hinge unit and the second hinge unit, and the first hinge unit or the second hinge unit may rotate around the rotary axis.

Further, the antenna unit may include a locking unit fastened to the communication unit by penetrating the plate, and the communication device may include a locking groove for fastening to the locking unit.

The communication device may include a connector to the second hinge unit.

Further, the second hinge unit may include a guide protrusion which protrudes on one surface of the second hinge unit.

Further, the communication device may include a guide arm slidably coupled to the guide protrusion, and the guide arm may include a guide groove positioned on an inner surface of the guide arm, and corresponding to the guide protrusion.

Further, the connector may include at least one terminal transmitting/receiving an electric signal, and the second hinge unit may include at least one socket corresponding to the at least one terminal.

Further, the first hinge unit may include a conductive bracket connected to the antenna unit, and the at least one socket may be connected to the conductive bracket by a cable.

Further, each of the first hinge unit and the second hinge unit may include a through hole, the through hole of the first hinge unit and the through hole of the second hinge unit may be aligned with each other, and the cable may penetrate the through hole of the first hinge unit and the through hole of the second hinge unit.

Further, the cable may be a coaxial cable.

Further, the hinge unit may include a plurality of module type hinge units for connecting the communication device and the antenna.

Further, the hinge unit may further include a shaft penetrating and fixing the plurality of module type hinge units.

Further, the hinge unit may further include a fixation band fixing the plurality of module type hinge units.

Further, the antenna unit may further include a cable connecting the communication device, and the cable may penetrate between the plurality of module type hinge units.

Further, each of the plurality of module type hinge units may include grooves corresponding to the cable on both side surfaces.

Further, each of the plurality of module type hinge units may include a first body having one end connected to the antenna unit, and penetrating the plate, a second body connected to the first body, and connected to the communication device, and a hinge structure for rotary motions of the first body unit and the second body.

Further, in order to solve the problem, a vehicle communicating according to the present disclosure may include any one antenna assembly of the antenna assemblies.

Further, the antenna assembly may include a hook for installation on a plate of the vehicle, and the plate of the vehicle may include a hook fixation unit corresponding to the hook.

Further, in order to solve the problem, a method for installing, on a vehicle, an antenna assembly including an antennal unit installable on one surface of a plate of a vehicle, a hinge unit having one end connected to the antenna unit, and a communication device connectable to another end of the hinge unit according to the present disclosure may include: forming a through hole for inserting the hinge unit on the plate of the vehicle; inserting the hinge unit into the through hole; installing the antenna unit on one surface of the plate of the vehicle; connecting the communication device to another end of the hinge unit; moving the communication device to be in line with another surface of the plate by a hinge structure of the hinge unit; and fastening the communication device to another surface of the plate.

Advantageous Effects

The present disclosure has an effect of providing a coupling structure and an installation method of economically and stably mounting an antenna assembly on a vehicle.

Furthermore, the present disclosure has an effect of providing a coupling structure and an installation method which can reduce manufacturing cost through an antenna assembly having a simple structure.

Furthermore, the present disclosure has an effect of providing a coupling structure and an installation method which can solidly mount the antenna assembly on the vehicle by using a hinge structure.

Furthermore, the present disclosure has an effect of providing a coupling structure and an installation method which can easily adjust the number of cables required for mounting the antenna assembly by utilizing a module scheme.

Advantages which can be obtained in the present disclosure are not limited to the aforementioned advantages and other unmentioned advantages will be clearly understood by those skilled in the art from the following description.

DESCRIPTION OF DRAWINGS

FIG. 1 is a diagram illustrating an external appearance of a vehicle including a shark fin antenna.

FIG. 2 is a diagram illustrating a structure in which an antenna unit and a communication device are connected by a cable.

FIG. 3 is a diagram illustrating an antenna unit according to an embodiment of the present disclosure.

FIGS. 4 and 5 are diagrams schematically illustrating an antenna assembly including a hinge unit according to the present disclosure.

FIGS. 6 to 8 are diagrams illustrating a hinge structure of the hinge unit according to the present disclosure.

FIGS. 9 to 13 are diagrams illustrating the antenna assembly according to the present disclosure.

FIG. 14 is a diagram schematically illustrating a communication device according to the present disclosure.

FIG. 15 is a diagram illustrating a plate of a vehicle for mounting the antenna assembly according to the present disclosure.

FIGS. 16 and 17 are diagrams illustrating the hinge unit according to the present disclosure.

FIG. 18 is a diagram illustrating a cable and a bracket included in the antenna assembly according to the present disclosure.

FIG. 19 is a diagram illustrating cross-sections of the bracket, the cable, and a socket.

FIGS. 20 to 22 are diagrams illustrating the antenna assembly according to the present disclosure.

FIGS. 23 to 26 are diagrams illustrating a connection scheme of the hinge unit and a connector according to the present disclosure.

FIG. 27 is a diagram illustrating that the antenna assembly is installed on the plate of the vehicle according to the present disclosure.

FIGS. 28 to 30 are diagrams illustrating that the antenna assembly is coupled according to the present disclosure.

FIGS. 31 to 39 are diagrams illustrating a module type hinge unit and an antenna assembly including a module type hinge unit according to the present disclosure.

FIGS. 40 to 47 are diagrams illustrating an antenna assembly including a module type connection unit according to the present disclosure.

FIG. 48 is a flowchart illustrating a method for installing an antenna assembly on a vehicle according to the present disclosure.

The accompany drawings, which are included to provide a further understanding of the present disclosure and are incorporated on and constitute apart of this specification illustrate embodiments of the present disclosure and together with the description serve to explain the principles of the present disclosure.

MODE FOR DISCLOSURE

Hereinafter, an embodiment disclosed in the present disclosure will be described in detail with reference to the accompanying drawings and the same or similar components are denoted by the same reference numerals regardless of a sign of the drawing, and duplicated description thereof will be omitted. Suffixes "module" and "unit" for components used in the following description are given or mixed in consideration of easy preparation of the present disclosure only and do not have their own distinguished meanings or roles. Further, in describing an embodiment disclosed in the present disclosure, a detailed description of related known technologies will be omitted if it is determined that the detailed description makes the gist of the embodiment of the present disclosure unclear. Further, it is to be understood that the accompanying drawings are just used for easily understanding the embodiments disclosed in the present disclosure and a technical spirit disclosed in the present disclosure is not limited by the accompanying drawings and all changes, equivalents, or substitutes included in the spirit and the technical scope of the present disclosure are included.

Terms including an ordinary number, such as first and second, are used for describing various elements, but the elements are not limited by the terms. The terms are used only to discriminate one element from another element.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is understood that no element is present between the element and another element.

A singular form includes a plural form if there is no clearly opposite meaning in the context.

In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Vehicular Shark Fin Antenna

FIG. 1 is a diagram illustrating an external appearance of a vehicle including a shark fin antenna and FIG. 2 is a diagram illustrating a structure in which an antenna unit and a communication device are connected by a cable.

According to FIGS. 1 and 2, a vehicle 10 including a shark fin antenna 100 includes an antenna unit 110 installed on an exterior of a roof (or top plate 11) of a vehicle body. The antenna unit 110 may include a shark fin type antenna housing 115 positioned on the exterior of the roof (or top plate 11) and mounted on a part close to a rear glass. The antenna housing 115 has a substantially streamlined body, and a front part of the streamlined body is placed to face the front of the vehicle 10.

According to FIG. 2, the antenna unit 110 and the communication device 130 may be connected by an RF cable FC. In this case, the RF cable FC penetrates the roof (or top plate) of the vehicle 10 in a thickness direction or is introduced into the vehicle 10 through molding between the roof and a glass of the vehicle 10 to be wired to the communication device 130. The RF cable FC introduced into a vehicle body is finished by an interior material to be prevented from being exposed to the outside.

As an antenna 111 installed inside an antenna housing 115, any one of an AM and FM receiving antenna, a DMB receiving antenna, a Global Navigation Satellite System (GNSS) receiving antenna, and a 3G/4G/5G/6G antenna unit 110 may be adopted, and more preferably, two or more are adopted to support a multi-band receiving function. The antenna 111 provided in the present disclosure may be implemented by various types of known antenna devices.

Further, the antenna 111 may be a component for receiving a signal of a radio and/or Digital Multimedia Broadcasting (DMB) band. The antenna 111 may be provided to receive a Terrestrial Digital Multimedia Broadcasting (TDMB) signal and an HSDPA signal or a Digital Audio Broadcasting Band III (DABIII) and a DAB-L signal or a GSM signal (GSM850/1900) according to a usage region.

Further, the antenna 111 may operate in 500 KHz to 1.7 MHz which is an AM broadcasting frequency band and in 88 MHz to 108 MHz which is an FM broadcasting frequency band. Further, the antenna 111 may operate in a band of 2.332 GHz to 2.345 GHz which is a digital satellite radio frequency band. Further, the antenna 111 may also operate in 824 MHz to 894 MHz which is a cellular frequency band and in a band of 1.850 GHz to 1.990 GHz which is a US PCS frequency band.

FIG. 3 is a diagram illustrating an antenna unit according to an embodiment of the present disclosure.

According to FIG. 3, the antenna unit 110 according to the present disclosure may include the antenna housing 115, the antenna 11, a circuit unit 113, and a lower base 114.

The antenna 111 according to the present disclosure may be formed in various forms unlike FIG. 2. The antenna 111 may be installed inside the antenna housing 115, and formed by considering the form of the antenna housing 115.

The antenna housing 115 may include a form including aerodynamics, and include the antenna 111, the circuit unit 113, etc., therein. The lower base 114 may correspond to a shape of a cross-section of the antenna housing 115, and serve to stably fix the circuit unit 113 and the antenna 111. Further, the lower base 114 may include a printed circuit board (PCB).

The circuit unit 113 may amplify the signal received from the antenna 111 or remove noise. Further, the circuit unity may amplify a signal to be transmitted by using the antenna 11. Further, the circuit unit 113 according to the present disclosure may be a GPS module. The antenna 111 may include a plurality of antennas 111*a* and 111*b*.

Antenna Assembly and Vehicle Comprising Antenna Assembly

Hereinafter, an antenna assembly and a vehicle comprising the same according to a first preferred embodiment of the present disclosure will be described as below in detail based on the above-described contents.

The antenna assembly according to the present disclosure may be a component including the ante and the antenna unit 110 according to FIGS. 1 to 3.

A vehicle described in this specification may be a concept including both an internal combustion engine vehicle having an engine as a power source, a hybrid vehicle having an engine and an electric motor as the power source, an electric vehicle having an electric motor as the power source, and the like.

FIGS. 4 and 5 are diagrams schematically illustrating an antenna assembly including a hinge unit according to the present disclosure.

According to FIG. 4, the antenna assembly according to the present disclosure may include the antenna unit 110, the hinge unit 120, and the communication device 130.

At least a part of the antenna unit 110 may be exposed to the outside of the vehicle 10. Further, the antenna unit 110 may also be positioned inside a space through which radio waves may pass even though the antenna unit 110 is not exposed to the outside of the vehicle 10. However, the antenna assembly according to the present disclosure is preferably installed on one surface of the plate of the vehicle 10.

One end of the hinge unit 120 may be connected to the antenna unit 110. The RF cable FC may be installed along the hinge unit 120. One end of the hinge unit 120 may be connected to the antenna unit 110 by the RF cable FC.

The communication device 130 may be connected to another end of the hinge unit 120. The communication device 130 may be connected to the antenna unit 110 by the RF cable FC installed along the hinge unit 120. The communication device 130 may mean a device that accesses a server of an online data communication system and performs a communication control function between an external server and the vehicle 10.

A primary function of the communication device 130 may include functions such as ① a control of state monitoring of a line and a terminal device, ② selection of the terminal device, and start and termination of transmission, error detection and transmission control, ③ code conversion between a transmission code and a computer internal code, and ④ conversion of a transmission speed and a processing speed.

According to FIG. 5, at least a part of the antenna unit 110 may be exposed to the outside of the top plate of the vehicle 10. Further, the antenna assembly according to the present disclosure is preferably installed on one surface of the top plate of the vehicle 10.

According to FIG. 5, one end of the hinge unit 120 may be connected to the antenna unit 110, and installed by penetrating the plate of the vehicle 10. Further, the hinge unit 120 may be installed by penetrating the top plate of the vehicle 10. The communication device 130 may be connected to another end of the hinge unit 120. The communication device 130 may be positioned inside the vehicle 10. In this case, the plate of the vehicle 10 (or the top plate of the vehicle 10) penetrated by the hinge unit 120 may include a through hole corresponding to the cross-section of the hinge unit 120.

FIGS. 6 to 8 are diagrams illustrating a hinge structure of the hinge unit according to the present disclosure.

According to FIGS. 6 to 8, the hinge unit 120 may include a hinge structure HS. By the hinge structure HS, the communication device 130 connected to another end of the hinge unit 120 may move. The hinge structure HS may mean a component that allows a first hinge unit (HS10, HS30) and/or a second hinge unit (HS20, HS40) to rotate or move around a central axis. That is, the communication device 130 may rotate around the central axis of the hinge structure HS.

The hinge structure HS of the hinge unit 120 may include a central axis for hinge-coupling the first hinge unit HS10 and the second hinge unit HS20. In this case, the hinge coupling in the present disclosure may mean coupling of structures which may freely rotate or move around the central axis. That is, the hinge coupling in the present disclosure may mean coupling of the first hinge unit HS10, the second hinge unit HS20, and the central axis.

According to FIG. 7, the first hinge unit HS10 may include a first body HS11 and a first coupling member HS12. The first body HS11 may have a plate shape. The first coupling member HS12 may include at least one hinge protrusion HS13. The hinge protrusion HS13 may be positioned on each of both side surfaces of the first coupling member HS12. The hinge protrusion HS13 may be a central axis to which the first hinge unit HS10 and the second hinge unit HS20 are hinge-coupled to rotate.

One end of the first body HS11 may include at least one projection member HS14. The projection member HS14 of the first body HS11 may be positioned at each of both corners of the first body HS11. The projection member HS14 of the first body HS11 may support a second coupling member HS22 of the second hinge unit HS20. The projection member HS14 of the first body HS11 may assist stable rotation of the first coupling member HS12 of the second coupling member HS22.

The second hinge unit HS20 may include a second body HS21 and a second coupling member HS12. The second body HS21 may have the plate shape. The second coupling member HS22 may correspond to the first coupling member HS12. The number of second coupling members HS22 may be larger than the number of first coupling members HS12 by one.

The second coupling member HS22 may include a hinge hole HS23 corresponding to the hinge protrusion HS13 of the first coupling member HS12. The hinge hole HS23 may be included in a location corresponding to the hinge protrusion HS13. The hinge protrusion HS13 may be inserted into the hinge hole HS23. The hinge protrusion HS13 is inserted into the hinge hole HS23, and as a result, the first coupling member HS12 and the second coupling member HS22 may form the hinge coupling. The hinge hole HS23 may be positioned on each of both side surfaces of the second coupling member HS22. Alternatively, the hinge hole HS23 may be positioned on one side surface of the second coupling member HS22.

In this case, the coupled hinge protrusion HS13 and hinge hole HS23 may form the hinge structure HS. That is, a direction in which the hinge protrusion HS13 is projected from the first coupling member HS12 may be a direction of the central axis at which the first hinge unit HS10 and the second hinge unit HS20 rotate. That is, the hinge protrusion HS13 and the hinge hole HS23 are coupled to form the central axis of the rotary motion.

According to FIG. 7, the number of first coupling members HS12 may be one and the number of second coupling members HS22 may be two. One first coupling member HS12 may be inserted between two second coupling members HS22. The hinge hole of the second coupling member HS22 may be positioned on a side surface of a location into which the first coupling member HS12 is inserted. The hinge hole HS23 of the second coupling member HS22 may be included in each of two second coupling members HS22. In this case, a width of the first coupling member HS12 may be smaller than a distance between two second coupling members HS22.

According to FIG. 7, the first hinge unit HS10 may include two projection members HS14. A distance between each projection member HS14 and the first coupling member HS12 may be larger than a width of the second coupling member HS22.

According to FIG. 8, the hinge structure HS of the hinge unit 120 may include a hinge axis. The hinge axis may penetrate the first coupling member HS32 of the first hinge unit HS30 and the second coupling member HS42 of the second hinge unit HS40. In order to couple the hinge axis HS50, the first coupling member HS32 may include a first through hole HS33 penetrating both side surfaces and the second coupling member HS42 may include a second through hole HS43 penetrating both side surfaces.

According to FIG. 8, the number of first coupling members HS32 may be one and the number of second coupling members HS32 may be two. In this case, all of two second coupling members HS42 may include the through holes HS43. The hinge axis HS50 may penetrate the through hole HS33 of the first coupling member HS32 and the through hole HS43 of the second coupling member HS42. Each of the first hinge unit HS30 and the second hinge unit HS40 may rotate around the hinge axis HS50.

FIGS. 9 to 13 are diagrams illustrating the antenna assembly according to the present disclosure.

According to FIG. 9, the antenna assembly 100 according to the present disclosure may be installed on the plate 11 of the vehicle 10. In this case, the antenna unit 110 and the communication device 130 may be connected through the RF cable FC installed along the hinge unit 120. The RF cable FC may penetrate the first hinge unit and the second hinge unit. The RF cable FC may be buried and installed in the first hinge unit and the second hinge unit.

According to FIG. 9, the communication device 130 rotates around the hinge axis by a rotation structure, and may be placed in line with the plate 11 of the vehicle 10. The communication device 130 may be placed in line with the plate 11 of the vehicle 10, and then fastened to the bottom surface of the plate 11. That is, when the structure is described based on the plate 11 of the vehicle 10, the antenna unit 110 may be positioned on one surface of the plate 11 of the vehicle 10, and the communication device 130 may be positioned on another surface of the plate 11 of the vehicle 10. In this case, one surface and another surface of the plate 11 of the vehicle 10 may mean surfaces opposite to each other. Preferably, the antenna unit 110 may be positioned on an outer surface of the plate 11 of the vehicle 10, and the communication device 130 may be positioned on an inner surface of the plate 11 of the vehicle 10. That is, the antenna unit 110 may be installed on the outer surface of the plate 11 of the vehicle 10, and the communication device 130 may be installed or fastened onto the inner surface of the plate 11 of the vehicle 10.

As such, the antenna assembly 100 according to the present disclosure may be coupled to both surfaces of the plate 11 of the vehicle 10 to be more stably coupled to the vehicle 10.

According to FIG. 10, the antenna assembly 100 according to the present disclosure includes the antenna unit 110, the hinge unit 120, and the communication device 130.

One end of the hinge unit 120 may be connected to the antenna unit 110, and another end of the hinge unit 120 may be connected to the communication device 130.

According to FIG. 10, the hinge unit 120 may be connected or coupled to the communication device 130. A guide protrusion 122G may be positioned on each of both side surfaces of the hinge unit 120. The guide protrusion 122G is projected from both side surfaces of the hinge unit 120.

The communication device 130 may include a guide arm 131 for coupling to the hinge unit 120. At least two guide arms 131 may be included. The guide arms 131 may be coupled to both side surfaces of the hinge unit 120. The inner surface of the guide arm 131 may include a guide hole 132 which may be coupled to the guide protrusion 122G. The guide hole 132 may be formed linearly along the inner surface of the guide arm 131. The guide protrusion 122G may be fastened to the guide hole 132, and the guide protrusion 122G may slidably move along the guide hole 132.

According to FIG. 10, the guide arm 131 may be positioned on the side surface of the communication device 130. That is, the hinge unit 120 may be coupled or connected to the side surface of the communication device 130.

According to FIG. 11, one end of the hinge unit 120 may be connected to a central portion of the antenna unit 110.

According to FIG. 12, one end of the hinge unit 120 may be connected to a side portion of the antenna unit 110. The hinge unit 120 may be connected to a lower surface of a rear portion of the antenna housing 115. In this case, the communication device 130 may be coupled to another end of the hinge unit 120, and the communication device 130 may be placed in line with the plate 11 of the vehicle 10. In this case, the communication device 130 is positioned at the lower portion of the antenna unit 110, and a front end of the antenna unit 110 and a terminal end of the communication device 130 may be positioned on the same vertical line. Through this, when the antenna assembly 100 is installed in the vehicle 10, a space occupied by the antenna assembly 100 may be smaller.

According to FIGS. 11 and 12, the communication device 130 may include a communication circuit unit 134 and a case 133. The communication circuit unit 134 may process the signal received form the antenna unit 110 or transmit the signal by using the antenna unit 110. The case 133 may form an external appearance of the communication device, and include the communication circuit unit 134 therein.

According to FIGS. 10 to 12, the antenna housing 115 may fully cover the lower base 114. The antenna housing 115 may cover the antenna and the lower base 114. Further, a part of the hinge unit 120 is projected on the plate 11 of the vehicle 10, and the antenna housing 115 may be formed in contact with the plate 11 of the vehicle 10. Therefore, the antenna housing 115 may protect up to the lower base 114 and a part of the hinge unit 120.

According to FIG. 13, the antenna unit 110 may further include a locking unit 116. The locking unit 116 may be formed downward from the bottom of the lower base 114. The locking unit 116 may include a first body 116A and a second body 116*b*B.

The first body 116A of the locking unit 116 is fastened to the antenna unit 110. A height of the first body 116A may be larger than a thickness of the plate 11 of the vehicle 10. The second body 116*b* may be formed downward from the first body 116A. An end portion of the second body 116B may have a hook shape.

The second body 116B may be inserted into a locking groove 135 of the communication device 130. The locking groove 135 of the communication device 130 may include a locking axis 135A. The locking axis 135A may correspond to the hook shape of the second body 116B. The hook shape of the second body 116B may be fastened to the locking axis 135A. The locking axis 135A may be a cylindrical form.

When the hook of the second body 116B is inserted into the locking groove 135, the locking axis 135A may be in contact with a taper surface of the hook. The hook may be pushed backward by a slope of the taper surface, and the hook may be pulled over so as to be fastened to the locking axis 135A.

When the second body 116B and the communication device 130 are fastened, one or more screw holes 113H1 and 113H2 for fastening the communication device 130 and the second body 116B may be included in order to increase the stability of the fastening. One or more screw holes 113H1 and 113H2 may be commonly formed in the communication device 130 and a part of the second body 116B. Central axes of the screw holes 113H1 and 113H2 formed in the communication device 130 and central axes of screw holes 116H1 and 116H2 formed in the second body 116B are aligned with each other. Therefore, when one screw (or nail) is inserted into one screw hole (113H1, 113H2, 116H1, or 116H2), the communication device 130 and the second body 116B are fixed to each other.

One or more screw holes 113H1 and 113H2 may include a first screw hole 113H1 vertical to the plate 11 of the vehicle 10 and a second screw hole 113H2 parallel to the plate 11 of the vehicle 10. In this case, the first screw hoe 113H1 may penetrate the communication circuit unit 134 inside the communication device 130.

According to FIG. 13, the antenna unit 110 may include an antenna 111', a circuit unit 113', and the lower base 114. The antenna 111' may have the streamlined form. The antenna unit 110 is connected to the communication device 130 by the hinge unit 120.

The hinge unit 220 is fixed by the guide arm 131 of the communication device 130. The communication device 130 may include the connector 136 for terminal-coupling to the hinge unit 120. The connector 136 may include the body 136A and at least one terminal 136B. At least one terminal 136B may be connected to the RF cable FC of the hinge unit 120. Detailed contents of the terminal coupling will be described below.

FIG. 14 is a diagram schematically illustrating a communication device according to the present disclosure.

According to FIG. 14, the communication device 2130 may include the guide arm 131, the guide hole 132, the connector 136, the body 136A and the terminal 136B constituting the connector 136, the case 133, and the locking groove 135 for connecting the locking unit. The connector 136 may also be buried in the communication device.

FIG. 15 is a diagram illustrating a plate of a vehicle for mounting the antenna assembly according to the present disclosure.

According to FIG. 15, the plate 11 of the vehicle 10 may include a first through hole 11H1 into which the hinge unit 120 may be inserted and a second through hole 11H2 into which the locking unit 116 may be inserted. The first through hole 11H1 may be a shape corresponding to the cross-section of the hinge unit 120, and the second through hole 11H2 may be a shape corresponding to the cross-section of the locking unit 116.

FIGS. 16 and 17 are diagrams illustrating the hinge unit according to the present disclosure.

According to FIGS. 16 and 17, the hinge unit 120 may include the first hinge unit 121, the second hinge unit 122, and the hinge structure HS. Contents of the description of the first hinge unit 121, the second hinge unit 122, and the hinge structure HS, which are duplicated with the above-described contents may be omitted.

According to FIGS. 16 and 17, the first hinge unit 121 may include a first body 121F and a bracket 121A positioned at the upper portion of the first body 121F. The bracket 121A may include a plurality of connection protrusions 121B. Although not illustrated in the figures, the bottom of the lower base 14 of the antenna unit 110 may include a plurality of corresponding connection grooves (not illustrated) so that the plurality of connection protrusions 121B may be inserted.

An internal cable 123 of the RF cable FC may be exposed to the upper portion of the bracket 121A. One end 123 of the RF cable FC may be exposed to the outside of the bracket 121A. Further, the internal cable of the RF cable FC may not be directly exposed to the outside, but a plurality of pins connected to one end of the RF cable FC may be exposed to the upper portion of the bracket 121A. Therefore, the antenna unit 110 may send and receive the signal to and from the communication device 130 through the internal cable 123 of the RF cable FC exposed to the upper portion of the bracket 121A or the plurality of pins.

According to FIGS. 16 and 17, the second hinge unit 122 may include a second body 122F, a guide protrusion 122G positioned on the side surface of the second body 122F, and at least one socket 122T which is projected to the outside on one surface of the second body 122F. The socket 122T may be connected to another end of the RF cable FC. The socket 122T may be connected to the connector 136 of the communication device 130. The socket 122T may be coupled to the terminal 136B of the connector 136 of the communication device 130. The cross-section of the socket 122T may correspond to the cross-section of the terminal 136B of the connector 136 of the communication device 130.

Further, the hinge unit 120 according to the present disclosure may be a module type hinge unit. The hinge unit 120 according to FIGS. 16 and 17 may be implemented in the form of a plurality of modules. Detailed contents will be described below.

FIGS. 18 and 19 are diagrams illustrating a cable and a bracket included in the antenna assembly according to the present disclosure.

According to FIG. 18, a connection protrusion 122B may be formed on the top of the bracket 122A, and a cable cap 122C may be formed on the bottom of the bracket 122A. The cable FC may include the internal cable 123 and a sheath 123A covering the internal cable 123. The sheath 123A may include an insulating material.

One end of the cable FC may be connected to the bracket 121A, and the internal cable 123 may be exposed to the upper portion of the bracket 121A. Another end of the cable FC may be connected to the socket 122T. When the socket 122T is connected to the terminal 136B of the connector 136, the antenna unit 110 and the communication device 130 may be connected through the cable FC.

The bracket 121A may include a conductive material. When the bracket 121A is the conductive material, the bracket 121A may be grounded along the connection protrusion 121B of the bracket 121A. The cable cap 121C connected to the bracket 121A allows the cable FC to be stably connected to the bracket 121A, and serves to assist the cable FC not to be short-circuited.

FIG. 19 is a diagram illustrating cross-sections of the bracket, the cable, and a socket.

According to FIG. 19, the internal cable 123 of the cable FC may be exposed to the outside of the bracket 121A. Further, the internal cable 123 of the cable FC may be connected to the socket 122T. The socket 122T may include a conductive pin 122P therein. The internal cable FC may be electrically connected to the conductive pin 122P. The conductive pin 122P may be inserted into the terminal 136B.

In this case, the cable FC may be the RF cable FC. Further, in some cases, the cable FC may also be a coaxial cable. A length of the cable FC may be equal to an entire length of the hinge 120 or larger than the entire length of the hinge unit 120 because the cable FC should be inserted into the hinge unit 120.

According to FIGS. 18 and 19, the cable FC is connected to the bracket 121A, and the bracket 121A may include a non-conductive material.

FIGS. 20 to 22 are diagrams illustrating the antenna assembly according to the present disclosure.

According to FIG. 20, the hinge unit 120 according to the present disclosure may be connected or coupled to the communication device 130 through the central portion of the communication device 130. Like this, the hinge unit 120 according to the present disclosure may be connected to various locations of the communication device 130.

According to FIG. 20, the front end of the antenna unit 110 according to the present disclosure may be positioned on the same vertical line as the front end of the communication device 130. Through this, the antennal assembly 100 may be assembled more stably.

According to FIG. 21, the hinge unit 120 according to the present disclosure may be connected or coupled to the communication device 130 through the central portion of the communication device 130. A central portion 137 of the communication device 130 may have a through hole penetrating the communication device 130 or have a groove form.

According to FIG. 21, the hinge unit 120 according to the present disclosure may include the guide protrusion 122G. One guide protrusion 122G may be positioned on each of both side surfaces of the hinge unit 120. The guide protrusion 122G of the hinge unit 120 may be slidably coupled to a guide groove 137H positioned on the inner surface of the central portion 137 of the communication device 130. The guide groove 137H may be positioned on each of the inner surfaces positioned at both sides of the central portion 137 of the communication device 130. The guide groove 137H may be formed at a location corresponding to the guide protrusion 122G of the hinge unit 120. The guide groove 137H is preferably dented deeper than a height of the guide protrusion 122G which is projected so that the guide protrusion 122G is stably coupled.

According to FIG. 21, the guide groove of the central portion of the communication device 130 may include a first section 137H1 and a second section 137H2 parallel to the surface of the communication device 130, and include a connection section 137H3 for connecting the first section 137H1 and the second section 137H2. The connection section 137H3 may be formed to correspond to heights of the first section 137H1 and the second section 137H2, and the connection section 137H3 may be formed in a diagonal direction to the surface of the communication device 130 in order to connect the first section 137H1 and the second section 137H2.

According to FIG. 21, the guide protrusion 122G of the hinge unit 120 may slidably move along the first section 137H1, the connection section 137H3, and the second section 137H2. Through this, the hinge unit 120 and the communication device 130 may be more stably slidably coupled.

According to FIG. 22, a side portion 137' of the communication device 130 may have a shape of being penetrated into the inside of the communication device 13. The side portion 137' of the communication device 130 may have a width corresponding to the width of the hinge unit 120.

According to FIG. 22, a guide groove 137H' into which the guide protrusion 122G is inserted and slidably moves may be formed on an inner surface of the side portion 137' of the communication device 130. The guide groove 137H' may include two sections 137H1' and 137H2' parallel to the surface of the communication device 130, and one section 137H3' formed diagonally to connect the sections 137H1' and 137H2'. However, the form of the guide groove 137H' may be changed to another form.

According to FIG. 22, a guide hole 137H" of the communication device 130 may include a first section 137H1" parallel to the surface of the communication device 130 and a second section 137H2" which extends as a curved line to the lower portion of the communication device 130, and a third section 137H3" formed toward the upper portion of the communication device 130 at an end of the second section 137H2". The guide protrusion 122G of the hinge unit 120 may slidably move along the first section 137H1" and the second section 137H2", and fixed to the third section 137H3". Through this, the antennal assembly 100 may be assembled more stably.

FIGS. 23 to 26 are diagrams illustrating a connection scheme of the hinge unit and a connector according to the present disclosure.

According to FIG. 23, the hinge unit 120 may include the first hinge unit 121, the second hinge unit 122, and the hinge structure HS. The first hinge unit 1 may include the first body 121F, the bracket 121A, and the connection protrusion 121B. In this case, the hinge structure HS may be appreciated as the hinge structure HS illustrated in FIGS. 7 and 8 described above.

The second hinge unit 122 may include a socket 122T extending toward the connector 136 and guide protrusions 122G formed on both side surfaces. The guide protrusion 122G may be slidably coupled along the guide groove 132 formed on the inner surface of the guide arm 131 of the communication device 130. In this case, the guide arm 131 is one example, and may be replaced with and appreciated as the guide grooves 137H, 137H', 137H" illustrated in FIGS. 21 and 22 described above.

According to FIG. 24, the guide protrusion 122G may be slidably coupled to the guide groove 132, and the socket 122T of the hinge unit 120 and the terminal 136B of the connector 136 may be coupled. The socket 122T of the hinge unit 120 and the terminal 136B of the connector 136 may be male-female-coupled.

According to FIG. 24, the inner surface of the guide arm 131 may include a taper surface 131T. When the hinge unit 120 is inserted into the communication device 130 while the guide protrusion 122G moves along the guide groove 132, the taper surface 131T may be in contact with the hinge structure HS of the hinge unit 120. A hinge axis 330 in the hinge structure HS may be pressed inward by the taper surface 131T. When the hinge axis 330 is pressed inward at both sides, fixation of the first hinge unit 121 and the second hinge unit 122 may be released. When the hinge axis 330 is not pressed, the first hinge unit 121 and the second hinge unit 122 may be fixed and not rotated.

According to FIG. 25, the hinge axis 330 according to FIG. 24 may include a pressing unit 331, a clasp 333A, and a body 332. The hinge axis 330 may be pressed inward from both sides. When the hinge axis 330 is pressed, the rotational force may be applied to the clasp 333A through a rotational member 334 inside the hinge axis 330 while the clasp 33 moves. The clasp 333A may enter the inside of the housing 333, and move by an elastic member 333B. The housing 333 may be positioned inside the body 332.

Although not illustrated in FIG. 25, a locking jaw (not illustrated) corresponding to the clasp 333A of the hinge axis may be included in the inner surface of the hinge structure HS into which the hinge axis 330 is inserted. The clasp 333A may be fastened to the locking jaw (not illustrated).

According to FIG. 25, the clasp 333A of the hinge axis 330 may be connected to an elastic member 333B. When the clasp 333A is pressed inward from the outside, the clasp 333A may enter the inside of the housing 333. When external pressure is released, the clasp 333A may be projected from the inside to the outside by elastic force. The clasp 333A may be fastened to the locking jaw (not illustrated) formed on the inner surface of the hinge structure HS.

According to FIGS. 24 and 25, the hinge axis 330 is inserted along the through hole of the hinge structure HS, and the clasp 333A may enter the inside of the housing 333 by the pressure while the hinge axis 330 is inserted. When the clasp 333A moves up to a portion where the locking jaw of the inner surface of the hinge structures HS is positioned, the external pressure applied to the clasp 333A may be released. When the external pressure applied to the clasp 333A is released, the clasp 333A may be projected to the outside of the housing 333 and the body 332, and fastened to the locking jaw. As the clasp 333A is fastened to the locking jaw, the first hinge unit 121 and the second hinge unit 122 may be fixed and not rotated.

According to FIGS. 24 and 25, the hinge axis 330 may be in contact with the taper surface of the guide arm 131 by sliding movement, and the pressing unit 331 may be pressed inward by the taper surface. As the pressing unit 331 is pressed, a fastening state of the clasp 333A of the hinge axis 330 to the locking jaw may be released while the clasp 333A rotates. That is, the fastening of the clasp 333A and the locking jaw may be released. Through this, the fixation state of the first hinge unit 121 and the second hinge unit 122 may be released, and the first hinge unit 121 and the second hinge unit 122 may be rotated by the hinge structure HS.

According to FIG. 26, the clasp 333A and the housing 333 are commenced. The clasp 333A may move in an internal direction of the housing 333. The clasp 333A may be connected to the elastic member 333B, and moved outward again by the elastic force of the elastic member 333B.

FIG. 26(*a*) illustrates a view in which the clasp 333A moves toward the outside of the housing 333 by the elastic force of the elastic member 333B. FIG. 26(*a*) illustrates a view in which the clasp 333A moves to the inside of the housing 333 by the external force. As such, by the movement of the clasp 333A, the clasp 333A may not interfere with the coupling of the hinge axis and the hinge structure HS.

FIG. 27 is a diagram illustrating that the antenna assembly is installed on the plate of the vehicle according to the present disclosure, and FIGS. 28 to 30 are diagrams illustrating that the antenna assembly is coupled according to the present disclosure.

According to FIG. 27, the hinge unit 120 may be connected to one side surface of the communication device 130, and the communication device 130 may be moved in line with the plate 11 of the vehicle 10 by the movement of the hinge structure HS of the hinge unit 120.

According to FIG. 28, a through hole H3 may be present at the central portion of the communication device 130, and the connector 136 may be positioned on one of inner surfaces of the through hole H3. The hinge unit 120 may be inserted into the through hole H3, and moved to the connector 136. Through this, the hinge unit 120 may be connected to the connector 136.

According to FIG. 28, hooks HK1 and HK2 may be positioned on the bottom of the lower base 114 of the antenna unit 110. The hook may be configured to include a first hook HK1 and a second hook HK2.

The first hook HK1 may be positioned at an opposite side to the second hook HK2. The first hook HK1 may be inserted into a first hook fixation unit H1 of the communication device 130. After the first hook HK1 may be inserted, and slidably moved and fastened into the first hook fixation unit H1. To this end, the form of the first hook fixation unit H1 may correspond to the form of the first hook HK1. There may be multiple first hooks HK1. As the number of hooks increases, the number of holes corresponding to the hooks may also increase.

According to FIG. 28, the first hook fixation unit H1 may be connected to a side hole H4. The side hole H4 may be formed on a horizontal surface of the communication device 130. The side hole H4 may penetrate from one side surface of the communication device 130 up to the first hook fixation unit H1. A fixation member (not illustrated) such as the screw or nail may be inserted into the side hole H4. That is, after the first hook HK1 may be inserted, and slidably moved and fastened into the first hook fixation unit H1, the fixation member (not illustrated) may be penetrated and inserted into the side hole H4. In this case, the fastening of the first hook HK1 becomes more solid, and the fastening is not released by external impact.

According to FIG. 28, the second hook HK2 may be positioned on the bottom of the lower base 114 of the antenna unit 110. The second hook KH2 may have an end portion which has a semi-circular form or includes an arc. The second hook HK2 may be inserted into a second hook fixation unit H2. The second hook fixation unit H2 may be formed to be projected to the upper portion of the communication device 130. The second hook fixation unit H2 may have a form corresponding to the form of the second hook HK2. When the second hook HK2 has the end portion which has the semi-circular form or includes the arc, the second hook fixation unit H2 may have a form corresponding to the form of the second hook HK2.

According to FIGS. 29 and 30, depths of the first hook HK1 and the second hook HK2 may be different from each other. The first hook HK1 and the second hook HK2 may be inserted into the hook fixation units H1 and H2 corresponding thereto, and inserted through the sliding movement. The first hook HK1 and the second hook HK2 may approach the communication device 130 in a vertical direction to the ground, and may be fastened to the corresponding hook fixation units H1 and H2 through sliding movement in a horizontal direction to the ground. As the first hook HK1 and the second hook HK2 are fastened, the hinge unit 120 may be connected to the connector 136.

According to FIGS. 28 to 30, a first fastening member 115A may be positioned at the front of the antenna unit 110. The first fastening member 115A may be formed to extend on the antenna housing 115 or the lower base 114. The first fastening member 115A may be connected to the antenna housing 115 or the lower base 114. The communication device 130 may include a second fastening member 138 corresponding to the first fastening member 115A. As the first hook HK1 and the second hook HK2 are fastened to the corresponding hook fixation unit H1 and H2, the first fastening member 115A and the second fastening member 138 may be placed on the same vertical axis.

According to FIGS. 28 to 30, through holes 115AH and 138H penetrating the first fastening member 115A and the second fastening member 138 are commenced. By the sliding movement, the center of the through hole 115AH of the first fastening member 115A and the center of the through hole 138H of the second fastening member 138 may be placed on the same vertical axis. In this case, the first fastening member 115A and the second fastening member 138 may be fixed or fastening by using a screw SC passing through both the through holes 115AH and 138H.

FIGS. 31 to 39 are diagrams illustrating an antenna assembly including a module type hinge unit according to the present disclosure.

According to FIG. 31, the antenna assembly 200 according to the present disclosure may include an antenna unit 210, a module type hinge unit 220, and a communication device 230. In this case, the antenna unit 210 is the same as the antenna unit 110 described above, and the communication device 230 is the same as the communication device 130 described above, and for convenience, different reference numerals are just used.

According to FIG. 31, the module type hinge unit 220 may be a component included in the hinge unit 120. The module type hinge unit 220 maintains the feature of the hinge unit 120 as it is, and may be constituted by a plurality of modules. That is, the hinge unit 120 may include a plurality of module type hinge units 220. Therefore, contents which are duplicated with or the same as the above-described contents in the description of the antenna assembly 200 of FIG. 31 may be omitted.

According to FIG. 32, the module type hinge unit 220 may include a first body 221 and a second body 222. The first body 221 may include a first groove 221GR1, a second groove 221GR2, a first fixation hole 221H1, and a connection protrusion 221B.

The first groove 221GR1 and the second groove 221GR2 may be used for installing the RF cable FC. The first groove 221GR1 and the second groove 221GR2 may be formed on both surfaces of the module type hinge unit 220, respectively. The first groove 221GR1 and the second groove 221GR2 may be formed on both surfaces of the first body 221, respectively. The first fixation hole 221H1 may penetrate the first body 221.

According to FIG. 32, the first groove 221GR1 may have a width corresponding to the thickness of the RF cable FC. Further, the depth of the first groove 221GR1 may be a depth corresponding to ½ of the thickness of the RF cable FC.

According to FIG. 32, the second groove 221GR2 may be connected to the first groove 221GR1. The second groove GR2 may connect the first groove 221GR1, and a third groove 222GR1 of the second body 222. The second groove 221GR2 may have a radial form which is widened toward an edge of the first body 221 from the first groove 221GR1.

According to FIG. 32, the second body 222 may include the third groove 222GR1 and a second fixation hole 222*h*. The third groove 222GR1 may be used for installing the RF cable FC. The third groove 222GR1 may be formed on each of both surfaces of the module type hinge unit 222. The third groove 222GR1 may be formed on each of both surfaces of the second body 222. The second fixation hole 222H may penetrate the second body 222.

According to FIG. 33, the second body 222 may further include a projection unit 222HS1 and a protrusion 222HS2 positioned on one surface of the projection unit 222HS1. Further, the first body 221 may further include a hinge hole 221H2 into which the projection unit 222HS1 and the protrusion 222HS2 of the second body 222. The protrusion 222HS1 of the second body 222 may be inserted into the hinge hole 221H2, and the protrusion 222HS1 of the second body 222 may be inserted into and hinge-coupled to the inside of the hinge hole 222H2. Therefore, the second body 222 may rotate around the protrusion 222HS2.

According to FIG. 34, the second body 222 may rotate at θ°. A plurality of module type hinge units 2220 may be overlapped and assembled. In this case, the RF cable FC may be installed along the grooves 221GR1, 221GR2, and 222GR1 formed on the side surface of the module type hinge unit 220. When the second body 222 rotates, the RF cable FC may also move jointly with the second body 222. In this case, since the RF cable FC also moves according to the formed grooves 221GR1, 221GR2, and 222GR1, the RF cable FC may move according to a radius of the second groove 221GR2.

According to FIGS. 35 and 36, the projection unit 222HS1 of the second body 222 may include protrusions 222HS2 and 222HS3 on both surfaces of the projection unit 222HS1, respectively. The first body 221 may include grooves 221H2 corresponding to the protrusions of both surfaces of the projection unit 222HS1 of the second body 222. As such, through the hinge structure including the protrusions 222HS2 and the 222HS3 on both surfaces of the projection unit HS1, the first body 221 and the second body 222 may rotate more stably. Hereinafter, descriptions which are the same as or duplicated with the contents disclosed in FIGS. 32 to 34 may be omitted.

According to FIGS. 34 and 37, a first module type hinge unit 220A to a fourth module type hinge unit 220D are assembled to form one hinge unit. The RF cable FC may be positioned between the first module type hinge unit 220A and a second module type hinge unit 220B. The RF cable FC may be positioned according to shapes of the grooves 221GR1, 221GR2, and 222GR1 formed on the side surface of each module type hinge unit 220. When the RF cable FC is inserted, a rotational radius of the module type hinge unit 220 may be limited by a radius of the second groove 221GR2 of the first body 221.

According to FIG. 37, a desired number of module type hinge units 220 are combined to form the hinge unit. An appropriate number of module type hinge units 220 may be assembled according to the number of required RF cables FC (or the number of required terminals). Preferably, the number of module type hinge units 220 may be larger than the number of required RF cables FC by one.

According to FIGS. 33, 36, and 37, each module type hinge unit 220 may include a through hole 221H1 penetrating the first body 221 and a through hole 222H penetrating the second body 222. In order to assemble the plurality of module type hinge units 220 into one, shafts BS1 and BS2 are inserted by penetrating the plurality of module type hinge units 220. In this case, at least one of the shaft BS1, BS2 may be inserted. The shafts BS1 and BS2 may include a first shaft BS1 inserted along the through hole 221H1 penetrating the first body 221 and a second shaft BS2 inserted along the through hole 222H penetrating the second body 222.

According to FIG. 37, the RF cable FC may be positioned between the plurality of module type hinge units 220. That is, the RF cable FC may include a first RF cable FC1 positioned between the first module type hinge unit 220A and the second module type hinge unit 220B, a second RF cable FC2 positioned between the second module type hinge unit 220B and a third module type hinge unit 220C, and a third RF cable FC3 positioned between the third module type hinge unit 220C and the fourth module type hinge unit 220D. The number of RF cables FC may be smaller than the number of module type hinge units 220 by one.

According to FIGS. 33, 36, and 38, in order to fix the plurality of module type hinge units 220, the antenna assembly 100 may further include a fixation band FB.

The fixation band FB may fix the second body 222. The fixation band FB may be formed along a circumference of the second body 222. A horizontal length of the fixation band FB may be in proportion to the number of plurality of module type hinge units 220. The fixation band FB is a component that may insert a plurality of second bodies 222 constituting the hinge unit 120.

The fixation band FB may be made of a material having elastic force. When the fixation band FB is made of a material having no elastic force, the form of the fixation band FB may correspond to the form of the circumference of the second body. When the plurality of module type hinge units 220 are assembled, the form of the fixation band FB may correspond to the form of the circumference of the second body 222.

According to FIG. 39, the plurality of module type hinge units 220 may be fixed by the shafts BS1 and BS2, and the fixation band FB. The RF cables FC inserted between the plurality of module type hinge units 220 may be projected further than the fixation band FB. However, unlike FIG. 39, the antenna assembly 100 may be fixed by only any one of the shafts BS1 and BS2 or the fixation band FB.

FIGS. 40 to 47 are diagrams illustrating an antenna assembly including a module type connection unit according to the present disclosure. Among them, the contents which are the same as or duplicated with the above-described contents may be omitted.

According to FIG. 40, the antenna assembly 300 may include an antenna unit 310, a module type connection unit 320, and a communication device 330. The module type connection unit 320 may be a component in which modules each formed by one body are combined without including the hinge structure. The module type connection unit 320 may mean a fixation type connection unit.

According to FIG. 41, the antenna assembly 100 may be installed on the vehicle 10. The module type connection unit may be installed on the periphery of the plate (or top plate) of the vehicle 10. More preferably, the module type connection unit 320 may be installed by penetrating the plate (or top plate) of the vehicle 10. The communication device 130 may be positioned inside the vehicle 10, and the antenna unit 110 may be positioned outside the vehicle 10. At least a part of the antenna unit 110 is preferably exposed to the outside of the vehicle 10.

According to FIG. 42, the module type connection unit 320 may be one connection unit. One end of the connection unit may be connected to the antenna unit 310 and another end of the connection unit may be connected to the communication device 330. In this case, the connection unit may have an L shape. The connection unit may include a part extending vertically to the communication device 130 and a part extending parallel to the communication device 130.

According to FIG. 42, the connection unit may include a plurality of RF cables FC, a plurality of connection protrusion 320B, and a body 320F. The RF cable FC may be installed by penetrating the inside of the body 320F, and the connection protrusion 320B may be formed to be projected on the upper surface of the body 320F.

According to FIG. 42, one end of the internal cable 123 of the RF cable FC may be exposed to the outside of the upper portion of the body. The exposed internal cable 123 and the antenna unit 110 may be connected. Further, the internal cable 123 is not exposed, but a metallic terminal is exposed to the outside of the body, and the RF cable FC may be connected to the metallic terminal. In this case, the metallic terminal may be connected to the antenna unit 110.

According to FIG. 42, another end of the internal cable 123 of the RF cable FC may also be connected to the socket and exposed to the outside of the body 320F.

According to FIG. 43, a single module of the module type connection unit 320 is commenced. The module type connection unit 320 may include an L-shaped body 321F, grooves 321GR formed in the L shape on both side surfaces of the body 321F, a plurality of through holes 321H1, 321H2, and 321H3 penetrating the body 321F, and a connection protrusion 321B projected on the upper portion of the body 321F.

According to FIGS. 43 and 44, the L-shaped groove 321GR may be a component for installing the RF cable FC. A width and a depth of the L-shaped groove 321GR may be in proportion to the thickness of the RF cable FC. The depth of the L-shaped groove 321GR may correspond to ½ of the thickness of the RF cable FC. The RF cable FC may be positioned between two L-shaped grooves 321GR facing each other.

According to FIG. 44, the RF cable FC may be positioned between the plurality of module type hinge units 320. That is, the RF cable FC may include a first RF cable FC1 positioned between the first module type connection unit 320A and the second module type connection unit 320B, a second RF cable FC2 positioned between the second module type connection unit 320B and a third module type connection unit 320C, and a third RF cable FC3 positioned between the third module type connection unit 320C and the fourth module type connection unit 320D. The number of RF cables FC may be smaller than the number of module type connection units 220 by one.

In this case, the RF cable FC may be a flexible material, but since the RF cable FC does not require a separate rotating operation, the RF cable FC may not include the flexible material. That is, the RF cable FC may be a non-flexible material.

According to FIGS. 45 and 46, in order to fix the plurality of module type connection units 320, the antenna assembly 100 may further include the fixation band FB.

The fixation band FB may fix the plurality of module type connection units 320. The fixation band FB may be formed along the circumferences of the plurality of module type connection units 320. The horizontal length of the fixation band FB may be in proportion to the number of plurality of module type connection units 320.

The fixation band FB may be made of a material having elastic force. When the fixation band FB is made of a material having no elastic force, the form of the fixation band FB may correspond to the form of the circumferences of the plurality of module type connection units 320. When the plurality of module type connection units 320 are assembled, the form of the fixation band FB may correspond to the form of the circumferences of the plurality of module type connection units 320.

According to FIG. 46, the plurality of module type connection units 320 may be fixed by the shafts BS1 and BS2, and the fixation band FB. The RF cables FC inserted between the plurality of module type connection units 320 may be projected further than the fixation band FB. However, unlike FIG. 46, the antenna assembly 300 may be fixed by only any one of the shafts BS1 and BS2 or the fixation band FB.

Although not illustrated in FIGS. 40 to 46, the antenna unit 110 and the communication device 130 may be the same as those illustrated in FIGS. 1 to 39. Therefore, a scheme in which the antenna unit 110 and the communication device 130 are coupled may be the same as the scheme described in FIGS. 1 to 39. However, for convenience, the same or duplicated description will be omitted.

FIG. 47 is a diagram illustrating an injection molded module type connection unit 320 according to the present disclosure.

According to FIG. 47, the module type connection unit 320 may include a body 321F2, a bracket 321F1 positioned at the upper portion of the body 321F2, and a connection protrusion 321B positioned at the upper portion of the bracket 321F1. In this case, the body 321F2 may be injected and formed. When the body 321F2 is injected as a non-conductor such as a plastic resin, the bracket 321F1 positioned at the upper portion of the body may include the conductive material or may be made of the conductive material.

When the bracket 321F1 is the conductive material, the connection protrusion 321B of the bracket 321F1 may also be the conductive material. In this case, the RF cable FC may be grounded through the bracket 321F1 or the connection protrusion 321B.

When the body is injection-molded as in FIG. 47, the RF cable FC may be the coaxial cable. The coaxial cable covers the internal cable (or internal conductor) with an insulator, and covers the periphery thereof with an external conductor, and the non-conductor may be positioned between the internal cable and the external conductor. In this case, centers of the internal conductor and the external conductor may have the same axis.

As described above, since specific examples for the antennal assembly including the module type connection unit 320 not including the hinge structure may be as follows.

First Example

An antenna assembly installed on a vehicle, comprising:
an antenna unit installed on one surface of a plate of the vehicle;
an L-shaped connection unit having one end connected to the antenna unit, and penetrating the plate; and
a communication device connected to another end of the L-shaped connection unit.

Second Example

The antenna assembly of the first example, further comprising:
a cable electrically connecting the antenna unit and the communication device.

Third Example

The antenna assembly of the second example, wherein
the cable is formed by penetrating an inside of the L-shaped connection unit, and
the cable is formed in an L shape along the L-shaped connection unit.

Fourth Example

The antenna assembly of the first example, wherein
the L-shaped connection unit
is formed by assembling a plurality of module type connection units.

Fifth Example

The antenna assembly of the fourth example, wherein
each of the plurality of module type connection units has the L shape.

Sixth Example

The antenna assembly of the fifth example, further comprising:
at least one cable electrically connecting the antenna unit and the communication device.

Seventh Example

The antenna assembly of the sixth example, wherein
each of the plurality of module type connection units includes grooves corresponding to the cable on both side surfaces.

Eighth Example

The antenna assembly of the seventh example, wherein
the groove
is formed in the L shape along the L-shaped connection unit, and
the cable
is positioned between two module type connection units among the plurality of module type connection units, and placed along the groove formed in the L shape.

Ninth Example

The antenna assembly of the sixth example, wherein
the plurality of module type connection units
is fixed by a shaft penetrating the plurality of module type connection units.

Tenth Example

The antenna assembly of the sixth example, wherein
the plurality of module type connection units
is fixed by a fixation band formed on borders of the plurality of module type connection units.

Eleventh Example

The antenna assembly of the sixth example, wherein
each of the plurality of module type connection units
includes an injected body and a conductive bracket.

Twelfth Example

The antenna assembly of the eleventh example, wherein
the at least one cable is a coaxial cable.

Thirteenth Example

The antenna assembly of the twelfth example, wherein
the conductive bracket includes a ground electrode.

Fourteenth Example

A vehicle communicating with an external server, comprising:
an antenna assembly of any one of the first to thirteenth examples.

Method for Installing Antenna Assembly on Vehicle

Hereinafter, a method for installing the antenna assembly on the vehicle according to a second preferred embodiment of the present disclosure will be described as below in detail based on the above-described contents.

The antenna assembly installed on the vehicle according to the second embodiment may be the antenna assembly illustrated in FIGS. 1 to 39.

Hereinafter, the second embodiment of the present disclosure is described in detail, and contents which are the same as or duplicated in the contents in the first described in the first embodiment may be omitted.

FIG. 48 is a flowchart illustrating a method for installing an antenna assembly on a vehicle according to the present disclosure.

According to FIG. 48, the method for installing the antenna assembly 100 on the vehicle 10 according to the present disclosure may include: forming a through hole 11H1 for inserting the hinge unit 120 on the plate 11 of the vehicle 10 (S1100); inserting the hinge unit 120 into the through hole 11H1 (S1200); installing the antenna unit 110 on one surface of the plate 11 of the vehicle 10 (S1300); connecting the communication device 130 to another end of the hinge unit 120 (S1400); moving the communication device 130 to be in line with another surface of the plate 11 by a hinge structure HS of the hinge unit 120 (S1500); and fastening the communication device 130 to another surface of the plate 11 (S1600).

The method for installing the antenna assembly 100 on the vehicle 10 according to the present disclosure may be as follows.

The forming of the through hole 11H1 for inserting the hinge unit 120 on the plate 11 of the vehicle 10 (S1100) may further include forming a through hole 11H2 for inserting a locking unit 116 into the plate 11 of the vehicle 10. In this case, the locking unit 116 may be a component for connecting the antenna unit 110 and the communication device 130 as described above in the first embodiment.

Further, the forming of the through hole 11H1 for inserting the hinge unit 120 on the plate 11 of the vehicle 10 (S1100) may further include forming hook fixation units H1 and H2 for inserting hooks HK1 and HK2 positioned at the lower portion of the antenna unit 110. In this case, the hooks HK1 and HK2 may be components for connecting the antenna unit 110 and the communication device 130 as described above in the first embodiment.

Further, the inserting the hinge unit 120 into the through hole (S1200) may further include inserting the antenna unit 110 and the connected locking unit 116.

The installing of the antenna unit 110 on one surface of the plate 11 of the vehicle 10 (S1300) may further include assembling the hinge structure HS. The assembling of the hinge structure HS may include connecting a coupling member of first hinge units HS10 and HS30 to a coupling member of second hinge units HS20 and H540. The coupling member of the first hinge units HS10 and HS30 and the coupling member of the second hinge units HS20 and HS40 may form the hinge structure HS which rotates around a central axis.

The inserting of the hinge axis 330 may include inserting a clasp 333A into the hinge axis 330, inserting the hinge axis 333 into a hinge hole of the coupling member while the clasp 333A is inserted, projecting the clasp 333A again when the clasp 333A reaches a specific point, and fastening a locking jaw and a clasp at the specific point.

The connecting of the communication device 130 to another end of the hinge unit 120 (S1400) may further include inserting the hooks HK1 and HK2 into hook fixation units H1 and H2 of the communication device 130, and fastening the hooks HK1 and HK2 and the hook fixation units H1 and H2 by sliding movement of the communication device 130.

Further, connecting of the communication device 130 to another end of the hinge unit 120 (S1400) may further include connecting a socket 122T of the hinge unit 120 and the connector 136 of the communication device 130. In this case, the socket 122T of the hinge unit 120 and the terminal of the connector 136 of the communication device 130 may be male-female-coupled to each other.

Further, the moving the communication device 130 to be in line with another surface of the plate 11 by the hinge structure HS of the hinge unit 120 (S1500) may further include arranging the locking unit 116 of the antenna unit 110 and the locking groove 135 of the communication device 130 on the same vertical line.

Further, the moving the communication device 130 to be in line with another surface of the plate 11 by the hinge structure HS of the hinge unit 120 (S1500) may further arranging the hooks HK1 and HK2 positioned on the bottom of the antenna unit 110 and the hook fixation units H1 and H2 positioned in the communication device 130 on the same vertical line.

Further, the moving the communication device 130 to be in line with another surface of the plate 11 by the hinge structure HS of the hinge unit 120 (S1500) may include pressing a pressing unit 331 of the hinge axis 330, releasing the fastening of the locking jaw of the clasp 333A by pressing the pressing unit 331, and rotating the communication device 130 to rotate in line with another surface of the plate 11 by releasing the fastening.

As such, although not illustrated in FIG. 48, the installing of the antenna assembly 100 may be apparently derived by those skilled in the art by the contents described in the first embodiment of the present disclosure.

The present disclosure described above can be embodied as computer readable codes on a medium in which a program is recorded. The computer readable medium includes all kinds of recording devices storing data which may be deciphered by a computer system. Examples of the computer readable medium include a hard disk drive (HDD), a solid state disk (SSD), a silicon disk drive (SDD), a ROM, a RAM, a CD-ROM, a magnetic tape, a floppy disk, an optical data storage device, and the like, and also include medias implemented in the form of a carrier wave (e.g., transmission through the Internet). Accordingly, the aforementioned detailed description should not be construed as restrictive in all terms and should be considered to be exemplary. The scope of the present disclosure should be determined by rational construing of the appended claims and all modifications within an equivalent scope of the present disclosure are included in the scope of the present disclosure.

In addition, although the exemplary embodiments have been mainly described above, these are merely examples and do not limit the present disclosure, and those skilled in the art to which the present disclosure pertains will know that various modifications and applications not illustrated above can be made within the scope without departing from the essential characteristics of the embodiment. For example, each component specifically shown in the exemplary embodiment may be implemented by being modified. In addition, it will be interpreted that differences related to the modifications and applications are included in the scope of the present disclosure defined in the appended claims.

The present disclosure is described based on an example in which the present disclosure is applied to Automated Vehicle & Highway Systems based on a 5 generation (G) system, but besides, the present disclosure may be applied to various wireless communication systems and Automated Vehicle & Highway Systems.

The invention claiemd is:

1. An antenna assembly installed on a vehicle, comprising:
- an antenna unit installed at a plate of the vehicle;
- a hinge unit; and
- a communication device,
- wherein the hinge unit comprises:
- a first hinge unit coupled to the antenna unit and penetrating the plate,
- a second hinge unit hinged with respect to the first hinge unit and configured to be coupled to a connector of the communication device, and
- wherein the connector comprises a guide arm comprising a guide groove configured to slidably receive a guide protrusion positioned at a side of the second hinge unit to facilitate coupling of the second hinge unit to the communication device.

2. The antenna assembly of claim 1, wherein the antenna unit includes a locking unit configured to be fastened to the communication device by penetrating the plate, and
- the communication device includes a locking groove configured to be fastened to the locking unit.

3. The antenna assembly of claim 1, wherein the connector includes at least one terminal configured to transmit and receive an electric signal, and
- the second hinge unit includes at least one socket corresponding to the at least one terminal.

4. The antenna assembly of claim 3, wherein the first hinge unit includes a conductive bracket connected to the antenna unit, and the at least one socket is connected to the conductive bracket by a cable.

5. The antenna assembly of claim 4, wherein each of the first hinge unit and the second hinge unit includes a through hole, the through hole of the first hinge unit and the through hole of the second hinge unit are aligned with each other, and the cable penetrates the through hole of the first hinge unit and the through hole of the second hinge unit.

6. The antenna assembly of claim 4, wherein the cable is a coaxial cable.

7. A vehicle configured to communicate with an external server, the vehicle comprising:

the antenna assembly of claim 1.

8. The vehicle of claim 7, wherein the antenna assembly includes a hook for installation at the plate of the vehicle, and the plate of the vehicle includes a hook fixation unit corresponding to the hook.

9. An antenna assembly installed on a vehicle, comprising:

an antenna unit installed on one surface of a plate of the vehicle;

a hinge unit which has one end connected to the antenna unit, and penetrates the plate; and a communication device connected to the other end of the hinge unit, wherein the hinge unit includes a plurality of module type hinge units for connecting the communication device and the antenna.

10. The antenna assembly of claim 9, wherein the hinge unit further includes a shaft penetrating and fixing the plurality of module type hinge units.

11. The antenna assembly of claim 9, wherein the hinge unit further includes a fixation band fixing the plurality of module type hinge units.

12. The antenna assembly of claim 9, wherein the antenna unit further includes a cable connecting the communication device, and the cable penetrates between the plurality of module type hinge units.

13. The antenna assembly of claim 12, wherein each of the plurality of module type hinge units includes grooves corresponding to the cable on both side surfaces.

14. The antenna assembly of claim 9, wherein each of the plurality of module type hinge units includes:

a first body having one end connected to the antenna unit, and penetrating the plate, a second body coupled to the first body, and connected to the communication device, wherein the plurality of module type hinge units is configured to allow rotation between the first body and the second body.

15. A method for installing, at a plate of a vehicle, an antenna assembly including an antenna unit, a hinge unit having one end connected to the antenna unit, and a communication device connectable to another end of the hinge unit, the method comprising:

installing the antenna unit at the plate of the vehicle such that the hinge unit passes through a through hole formed at the plate;

connecting the communication device to the another end of the hinge unit, wherein the hinge unit includes a plurality of module type hinge units for connecting the communication device and the antenna;

rotating the communication device via the hinge unit toward the plate to secure a first locking portion of the communication device to a second locking portion of the antenna unit protruding through the plate.

* * * * *